US011945011B2

(12) United States Patent
Lovell

(10) Patent No.: US 11,945,011 B2
(45) Date of Patent: Apr. 2, 2024

(54) PIPE CLEANING ASSEMBLY AND METHOD OF CLEANING A PIPING SYSTEM USING THE SAME

(71) Applicant: FISHER CONTROLS INTERNATIONAL LLC, Marshalltown, IA (US)

(72) Inventor: Michel K. Lovell, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 210 days.

(21) Appl. No.: 17/111,060

(22) Filed: Dec. 3, 2020

(65) Prior Publication Data
US 2022/0176418 A1  Jun. 9, 2022

(51) Int. Cl.
*B08B 9/032* (2006.01)
*F16L 45/00* (2006.01)
*F16L 58/18* (2006.01)

(52) U.S. Cl.
CPC ............ *B08B 9/0321* (2013.01); *F16L 45/00* (2013.01); *F16L 58/187* (2013.01)

(58) Field of Classification Search
CPC ...... B08B 9/04; B01D 46/02; B01D 24/4642; B01D 46/42; F15B 2013/006; F15B 15/00; F15B 15/202; F15B 13/0405; F15B 13/0433; F15B 18/00; F16K 47/08
USPC .................................................. 134/166 R
See application file for complete search history.

(56) References Cited

U.S. PATENT DOCUMENTS

| 4,711,272 A | * | 12/1987 | Wiseman | ................. | F16K 25/00 137/315.09 |
| 4,812,856 A | * | 3/1989 | Wallace | .................... | B41J 2/175 347/89 |
| 8,245,727 B2 | * | 8/2012 | Mooney | ............... | G05D 16/163 138/40 |

(Continued)

FOREIGN PATENT DOCUMENTS

GB    2309063 A  *  7/1997  ........... F16K 47/045

OTHER PUBLICATIONS

FisherTM TBX Blowdown Fixture D103207X012 Instruction Manual (Jun. 2017).

(Continued)

*Primary Examiner* — David G Cormier
*Assistant Examiner* — Thomas Bucci
(74) *Attorney, Agent, or Firm* — MARSHALL, GERSTEIN & BORUN LLP

(57) ABSTRACT

A pipe cleaning assembly has a connection fixture having a body defining a cavity. A first aperture, opposing first auxiliary aperture coaxially aligned with the first aperture, second aperture, and opposing second auxiliary aperture coaxially aligned with the second aperture are in fluid communication with the cavity. A first connection flange extends from and surrounds the first aperture, a second connection flange extends from and surrounds the second aperture, a third connection flange extends from and surrounds the first auxiliary aperture, and a fourth connection flange extends from and surrounds the second auxiliary aperture. A first valve is connected to the third connection flange to control fluid flow through the first auxiliary aperture.

10 Claims, 18 Drawing Sheets

(56) References Cited

U.S. PATENT DOCUMENTS

| | | | |
|---|---|---|---|
| 2008/0053545 A1* | 3/2008 | Wears | F16K 1/422 |
| | | | 137/625.48 |
| 2014/0090414 A1* | 4/2014 | McLane | F16K 5/0471 |
| | | | 62/115 |
| 2015/0060707 A1* | 3/2015 | Baasch | F16K 1/22 |
| | | | 251/59 |
| 2015/0096619 A1* | 4/2015 | Greenwood | F15B 13/0433 |
| | | | 137/625.48 |
| 2017/0152957 A1* | 6/2017 | Roche | H01M 10/6568 |

OTHER PUBLICATIONS

FisherTM TBX Blowout Fixture D103206X012 Instruction Manual (Jul. 2017).

* cited by examiner

PIPE CLEANING ASSEMBLY AND METHOD OF CLEANING A PIPING SYSTEM USING THE SAME

FIELD OF THE DISCLOSURE

This disclosure relates generally to the cleaning of piping systems and, more particularly, to pipe cleaning assemblies for use in cleaning piping systems.

BACKGROUND

Cleaning process plant piping systems is required before a new plant can be commissioned and manufacturers of large rotating equipment such as turbines and compressors usually define the cleanliness level required, as incomplete cleaning of the piping system can result in costly damage and/or premature wear of turbines, compressors, pumps, or other large equipment. The cleaning process is often engineered by either an EPC contractor or a firm that specializes in cleaning services and, typically, temporary piping, valves, and hoses are installed to clean the piping system. The piping system is then pressurized and, once a specified pressure has been reached, the piping system is vented. This process is repeated until the piping system reaches the desired level of cleanliness.

Often the cleaning contractor will need to weld pipe connections to the piping system for the temporary piping. After the cleaning process these pipe connections will be removed and the piping system will be repaired. However, this process is time consuming, expensive, and any work done to the system after the cleaning process can potentially re-contaminate the piping system.

In addition, large sliding stem control valves often require noise reducing valve trim to meet specified noise limits, which is achieved by breaking the flow into many small jets using a cage element with many small passages. These small passages are susceptible to plugging if any particulate is present in the flow stream. In addition, as the valve plug in these control valves is moved downward to close the valve, debris caught in the cage passages can become wedged between the plug and the cage, resulting in trim damage to the valve.

Currently, one way to avoid damage to control valves during the cleaning process is to use a blowout plug in place of the trim in typical control valves that passes debris through the valve. However, this does not remove the debris from a closed system such as a refrigerant loop. Another method is to use a blowout plug in place of the trim that passes debris out the top of the valve. These can typically be used for steam systems equipped with a relatively large boiler that can be used to create large flow rates to clean the piping. However, both of these solutions require the disassembly and configuration of the control valves with the blowout plugs and reconfiguration with the standard trim once cleaning is complete, which most users will not do, and both require piping systems that have high flow rates.

BRIEF SUMMARY OF THE DISCLOSURE

In accordance with one exemplary aspect of the present invention, a pipe cleaning assembly comprises a connection fixture comprising a body defining a cavity, a first aperture, an opposing first auxiliary aperture coaxially aligned with the first aperture, a second aperture, and an opposing second auxiliary aperture coaxially aligned with the second aperture, in fluid communication with the cavity. A first connection flange extends from and surrounds the first aperture, a second connection flange extends from and surrounds the second aperture, a third connection flange extends from and surrounds the first auxiliary aperture, and a fourth connection flange extends from and surrounds the second auxiliary aperture. A first valve is connected to the third connection flange of the connection fixture to control fluid flow through the first auxiliary aperture.

In further accordance with any one or more of the foregoing exemplary aspects of the present invention, a pipe cleaning assembly may further include, in any combination, any one or more of the following preferred forms.

In one preferred form, an axis of the first aperture is perpendicular to an axis of the second aperture.

In another preferred form, a plate is positioned over the second auxiliary aperture and secured to the body to prevent fluid flow through the second auxiliary aperture.

In another preferred form, a second valve connected to the fourth connection flange of the connection fixture to control fluid flow through the second auxiliary aperture.

In accordance with another exemplary aspect of the present invention, a pipe cleaning assembly comprises a connection fixture comprising a body defining a cavity, a first aperture, an opposing first auxiliary aperture coaxially aligned with the first aperture, a second aperture, and an opposing second auxiliary aperture coaxially aligned with the second aperture, in fluid communication with the cavity. A first connection flange extends from and surrounds the first aperture, a second connection flange extends from and surrounds the second aperture, a third connection flange extends from and surrounds the first auxiliary aperture, and a fourth connection flange extends from and surrounds the second auxiliary aperture. A diverter trim is inserted through the second auxiliary aperture and positioned within the cavity of the body and includes a wall that extends across the diverter trim and directs fluid flowing through the connection fixture.

In further accordance with any one or more of the foregoing exemplary aspects of the present invention, a pipe cleaning assembly may further include, in any combination, any one or more of the following preferred forms.

In one preferred form, the diverter trim directs fluid between the first aperture and the second aperture and prevents fluid flow to the first auxiliary aperture and the second auxiliary aperture.

In another preferred form, a filter is positioned between the diverter trim and the second aperture.

In another preferred form, the diverter trim directs fluid between the first aperture and the second auxiliary aperture and between the second aperture and the first auxiliary aperture.

In another preferred form, a first valve is connected to the third connection flange of the connection fixture and/or a second valve is connected to the fourth connection flange of the connection fixture to control fluid flow through the first auxiliary aperture and/or the second auxiliary aperture.

In another preferred form, a first diverter pipe is connected to the fourth connection flange of the connection fixture and in fluid communication with the second auxiliary aperture, a second diverter pipe is connected to the third connection flange of the connection fixture and in fluid communication with the first auxiliary aperture, a valve is positioned between the first diverter pipe and the second diverter pipe, and the diverter trim redirects fluid from the first aperture to the second auxiliary aperture and from the first auxiliary aperture to the second aperture.

In another preferred form, a filter is positioned between the diverter trim and the second aperture.

In accordance with another exemplary aspect of the present invention, a method of cleaning a piping system comprises the steps of: installing a connection fixture between a first pipe section of the piping system and a second pipe section of the piping system, the connection fixture comprising a body defining a cavity, a first aperture in fluid communication with the cavity, a first connection flange extending from and surrounding the first aperture and configured to be secured to a flange of the first pipe section, an opposing first auxiliary aperture in fluid communication with the cavity and coaxially aligned with the first aperture, a second aperture in fluid communication with the cavity, a second connection flange extending from and surrounding the second aperture and configured to be secured to a flange of the second pipe section, and an opposing second auxiliary aperture in fluid communication with the cavity and coaxially aligned with the second aperture; flowing a pressurized fluid through piping system; removing the connection fixture; and installing a control valve between first pipe section and second pipe section.

In further accordance with any one or more of the foregoing exemplary aspects of the present invention, a method of cleaning a piping system may further include, in any combination, any one or more of the following preferred forms.

In one preferred form, the step of removing the control valve from the first pipe section and the second pipe section before installing the connection fixture.

In another preferred form, the step of installing a first valve at one of the first auxiliary aperture or the second auxiliary aperture, wherein the step of flowing a pressurized fluid through the piping system includes closing the valve, pressurizing the piping system, and opening the valve to vent debris from the piping system.

In another preferred form, the method comprises the steps of: installing a diverter trim through the second auxiliary aperture and into the cavity of the body of the connection fixture, the diverter trim having a wall that extends across the diverter trim; and positioning the diverter trim such that the wall directs fluid between the first aperture and the second aperture and prevents fluid flow to the first auxiliary aperture and the second auxiliary aperture.

In another preferred form, the method comprises the step of installing a filter between the diverter trim and the second aperture.

In another preferred form, the method comprises the steps of: installing a diverter trim through the second auxiliary aperture and into the cavity of the body of the connection fixture, the diverter trim having a wall that extends across the diverter trim; and positioning the diverter trim such that the wall directs fluid between the first aperture and the second auxiliary aperture and between the second aperture and the first auxiliary aperture.

In another preferred form, the method comprises the step of connecting a first valve to the third connection flange of the connection fixture and/or a second valve to the fourth connection flange of the connection fixture to control fluid flow through the first auxiliary aperture and/or the second auxiliary aperture, wherein the step of flowing a pressurized fluid through the piping system includes closing the first valve and/or the second valve, pressurizing the piping system, and opening the first valve and/or the second valve to vent debris from the piping system.

In another preferred form, the method comprises the steps of: connecting a first diverter pipe to the fourth connection flange of the connection fixture at the second auxiliary aperture; connecting a second diverter pipe to the third connection flange of the connection fixture at the first auxiliary aperture; and positioning a valve between the first diverter pipe and the second diverter pipe; wherein the step of flowing a pressurized fluid through the piping system includes closing the valve, pressurizing the piping system, and opening the valve.

In another preferred form, the method comprises the step of installing a filter between the diverter trim and the second aperture.

DETAILED DESCRIPTION

Protection of control valves and other sensitive equipment during hydrostatic testing and cleaning of a piping system is of critical importance to successful plant operation. The example pipe cleaning assemblies shown and described herein can be configured to allow multiple modes of cleaning, and in some examples flow control function, and enable more thorough and economical cleaning of a newly fabricated piping system and prevent damage to control valve trim, rotating equipment, and other sensitive devices used within the process industries. The pipe cleaning assemblies have the same dimensions as the control valves, such as large angle style control valve such as the Fisher® Design FB and EA, or other equipment that they replace in the piping system and use flanges to connect to the piping system, rather than being welded in, which avoids contamination of the piping system after cleaning when the pipe cleaning assemblies are removed and the control valve or other equipment is installed. The flow capacity and noise reduction capability can also be adjusted to mimic that of the control valve or other equipment to provide realistic operation of the piping system prior to installation of the control valve or other equipment. The modular design allows the pipe cleaning assemblies the use of the same basic connection fixture to be configured to allow different cleaning modes to be selected without disassembling or rebuilding the assembly, for example, by merely rotating a diverter trim or bonnet within the assembly. This saves time and reduces labor by offering quick-change cleaning mode selection.

Figure 1:
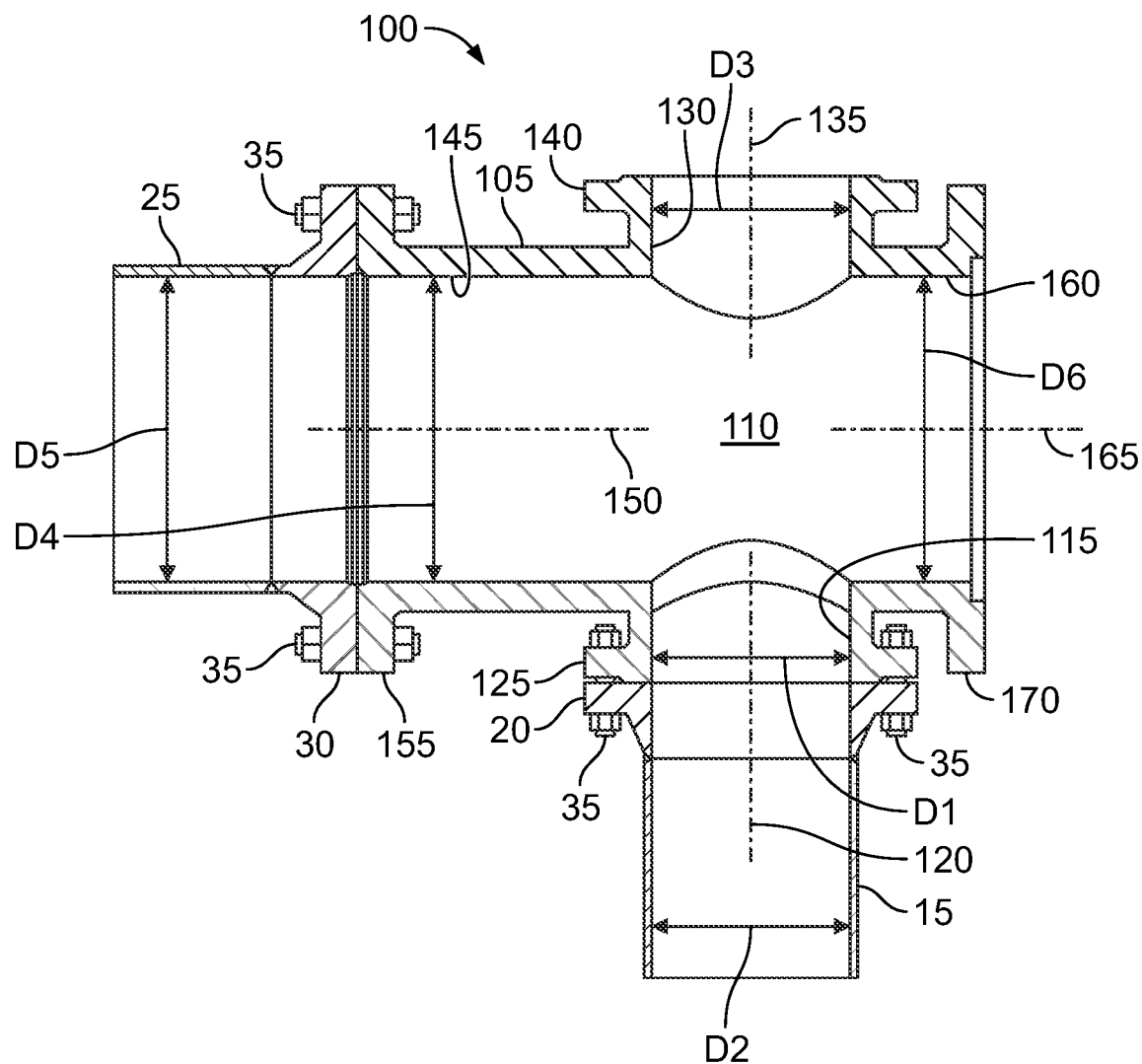
FIG. 1 is a side cross-sectional view of an example connection fixture.

Referring to FIG. 1, an example connection fixture 100 is shown secured between a first pipe section 15 and a second pipe section 25 of a piping system. As discussed above, connection fixture 100 can be used in place of an angle valve or other sensitive component during hydrostatic testing and cleaning of the piping system to avoid damage to the valve/sensitive component and eliminates the need for temporary pipe connections or access points to be installed for pipe cleaning purposes. Connection fixture 100 can be manufactured using 3D sand printing, which reduces cost and allows connection fixture 100 to be custom engineered for each order, and has a body 105 that defines a cavity 110 and first and second apertures 115, 145 formed through body 105 in fluid communication with cavity 110. In the example shown, since connection fixture 100 is configured to replace an angle valve, first aperture 115 has an axis 120 that is perpendicular to an axis 150 of second aperture 145. First and second connection flanges 125, 155 extend from and surround first and second apertures 115, 145, respectively, to allow connection fixture 100 to be removably secured to first and second pipe sections 15, 25 in place of an angle valve or other component, without any welding or cutting of the piping system, which can create additional contaminants in the piping system during installation and removal. First and second connection flanges 125, 155 match the flanged ends of the control valve so that connection fixture 100 can be installed in place of the control valve in the piping system, which allows the piping system to be accurately fabricated and then hydrostatically tested while the control valve remains safely in storage. First connection flange 125 is secured to flange 20 of first pipe section 15 with threaded members 35, such as bolts and nuts, and second connection flange 155 is secured to flange 30 of second pipe section 25 with threaded members 35.

A first auxiliary aperture 130 is also formed through body 105, opposite first aperture 115, is in fluid communication with cavity 110, and has an axis 135 that is coaxially aligned with the axis 120 of first aperture 115. Similarly, a second auxiliary aperture 160 is formed through body 105, opposite second aperture 145, is in fluid communication with cavity 110, and has an axis 165 that is coaxially aligned with the axis 150 of second aperture 145. Third and fourth connection flanges 140, 170 extend from and surround first and second auxiliary apertures 130, 160, respectively, to allow additional pipes and components to be connected to connection fixture 100, as described in more detail below.

The inside diameter D1 of first aperture 115 matches the inside diameter D2 of first pipe section 15 and the inside diameter D3 of first auxiliary aperture 130 and the inside diameter D4 of second aperture 145 matches the inside diameter D5 of second pipe section 25 and the inside diameter D6 of second auxiliary aperture 160, which allows connection fixture 100 to be used to launch or receive pipeline scrapers (e.g., cleaning pigs), if desired.

Connection fixture 100 also supports a wide variety of optional components, as discussed in more detail below, that allow the piping system to be economically cleaned in a number of different ways and allows the fabricators of the piping system to formulate a superior cleaning strategy customized for the particular piping system.

Figure 2:
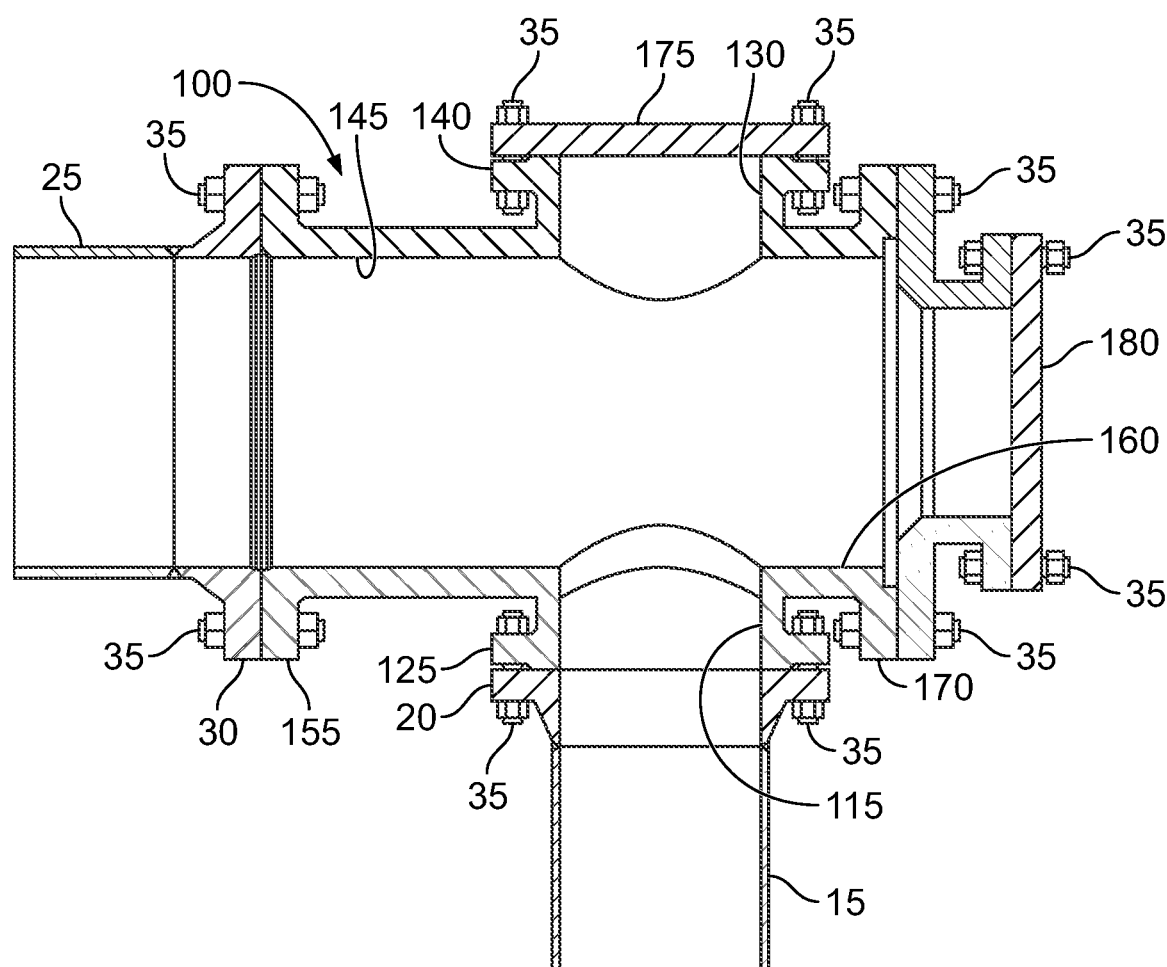
FIG. 2 is the connection fixture of FIG. 1 configured for hydrostatic testing.

Third and fourth connection flanges 140, 170 can be standard ANSI RF flanges, which can be fitted with blind flanges for hydrostatic pressure testing of the piping system, as shown in FIG. 2. As can be seen in FIG. 2, a first plate 175 (blind flange) can be positioned over first auxiliary aperture 130 and secured to third connection flange 140 of body 105, for example with threaded members 35, to prevent fluid flow through first auxiliary aperture 130. A second plate 180 (blind flange) can also be positioned over second auxiliary aperture 160 and secured to fourth connection flange 170 of body 105, for example with threaded members 35, to prevent fluid flow through second auxiliary aperture 160. Configured in this manner, connection fixture 100 allows unrestricted flow in either direction, is completely sealed, and can be used for hydrostatic pressure testing of the piping system.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Once connection fixture 100 has been installed and first and second plates 175, 180 secured over first and second auxiliary apertures 130, 160, pressurized fluid can flow through piping system to hydrostatically test and/or clean the piping system. Once the testing and/or cleaning is complete, connection fixture 100 can be removed and the control valve can be installed between first pipe section 15 and second pipe section 25. This process allows the piping system to be cleaned without risking wear or damage to the control valve during the cleaning process.

Figure 3:
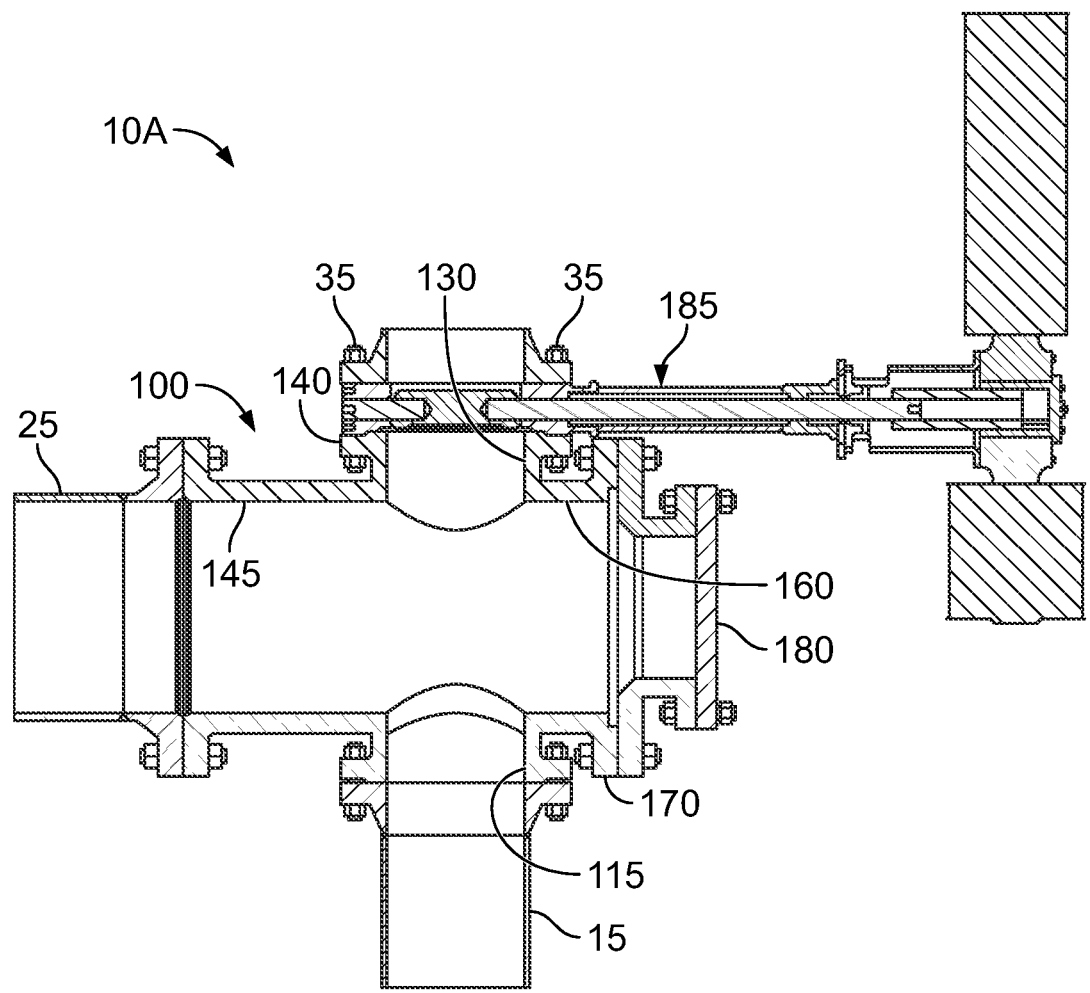
FIG. 3 is a side cross-sectional view of a first example pipe cleaning assembly including the connection fixture of FIG. 1.

Cleaning of the piping system can be done it a variety of ways as described in ASME B31.3, Appendix A, such as water flush, steam blow, or air blow. Depending on the cleaning method used, connection fixture 100 can be configured to remove debris from the piping system by removing first and/or second plates 175, 180 from body 105 to allow fluid and debris to be blown out through one or both of first and/or second auxiliary apertures 130, 160 when the piping system is pressurized, which is highly advantageous for closed piping systems that have no existing vent location. Because connection fixture 100 has more capacity than the control valve it replaces, higher pipe velocities can be achieved resulting in improved cleaning of the piping system. Used in this manner, connection fixture 100 allows any debris within the piping system to flow through connection fixture 100. If desired, the flow coefficient (Cu) of connection fixture 100 can be adjusted to meet the needs of the designer of the cleaning procedure. However, this method of cleaning requires a large amount of steady state flow, which is often not available. In these situations, the open auxiliary aperture(s) could be blocked with a valve(s), as shown in FIGS. 3 and 4 and described below.

In some piping systems, the fluid pressure may not be high enough to merely remove first and/or second plates 175, 180 and allow the fluid pressure to blow out the debris. Referring to FIG. 3, a first example pipe cleaning assembly 10A is shown that uses connection fixture 100 and can be used to seal connection fixture 100 to allow the fluid pressure to build and then open first auxiliary aperture 130 to blow out the pressurized fluid and debris. As can be seen in FIG. 3, a first valve 185, such as a butterfly valve or a ball valve, can be positioned over first auxiliary aperture 130 and connected to third connection flange 140 of connection fixture 100 to control fluid flow through first auxiliary aperture 130. In addition, second plate 180 can also be positioned over second auxiliary aperture 160 and secured to fourth connection flange 170 of body 105, for example with threaded members 35, to prevent fluid flow through second auxiliary aperture 160. Configured in this manner, first valve 185 can be closed to allow the pressure in the piping system to be built up and then quickly opened to allowed fluid and debris to be blown out of the piping system through first auxiliary aperture 130. Alternatively, depending on the direction of fluid flow, a second valve 190 could be positioned over second auxiliary aperture 160 and secured to fourth connection flange 170 and a first plate 175 could be positioned over first auxiliary aperture 130 and secured to third connection flange 140. Configured in this manner, second valve 190 can be closed to allow the pressure in the piping system to be built up and then quickly opened to allowed fluid and debris to be blown out of the piping system through second auxiliary aperture 160.

In these configurations, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Either first valve 185 or second valve 190 is then installed at first auxiliary aperture 130 or second auxiliary aperture 160, depending on the fluid flow direction, and either first plate 175 or second plate 180 is installed on the other of first auxiliary aperture 130 or second auxiliary aperture 160. Once installed, first/second valve 185/190 is closed, the piping system is pressurized, and, once pressurized and the target pressure has been reached, first/second valve 185/190 is rapidly opened to depressurize the piping system at high flow rates and vent debris from the piping system to clean the piping system. This technique allows the piping system to be pressurized with a relatively small compressor and yet high flow rates can be achieved. Once the cleaning is complete, connection fixture 100 can be removed and the control valve can be installed between first pipe section 15 and second pipe section 25. This process allows the piping system to be cleaned without risking wear or damage to the control valve during the cleaning process.

Figure 4:
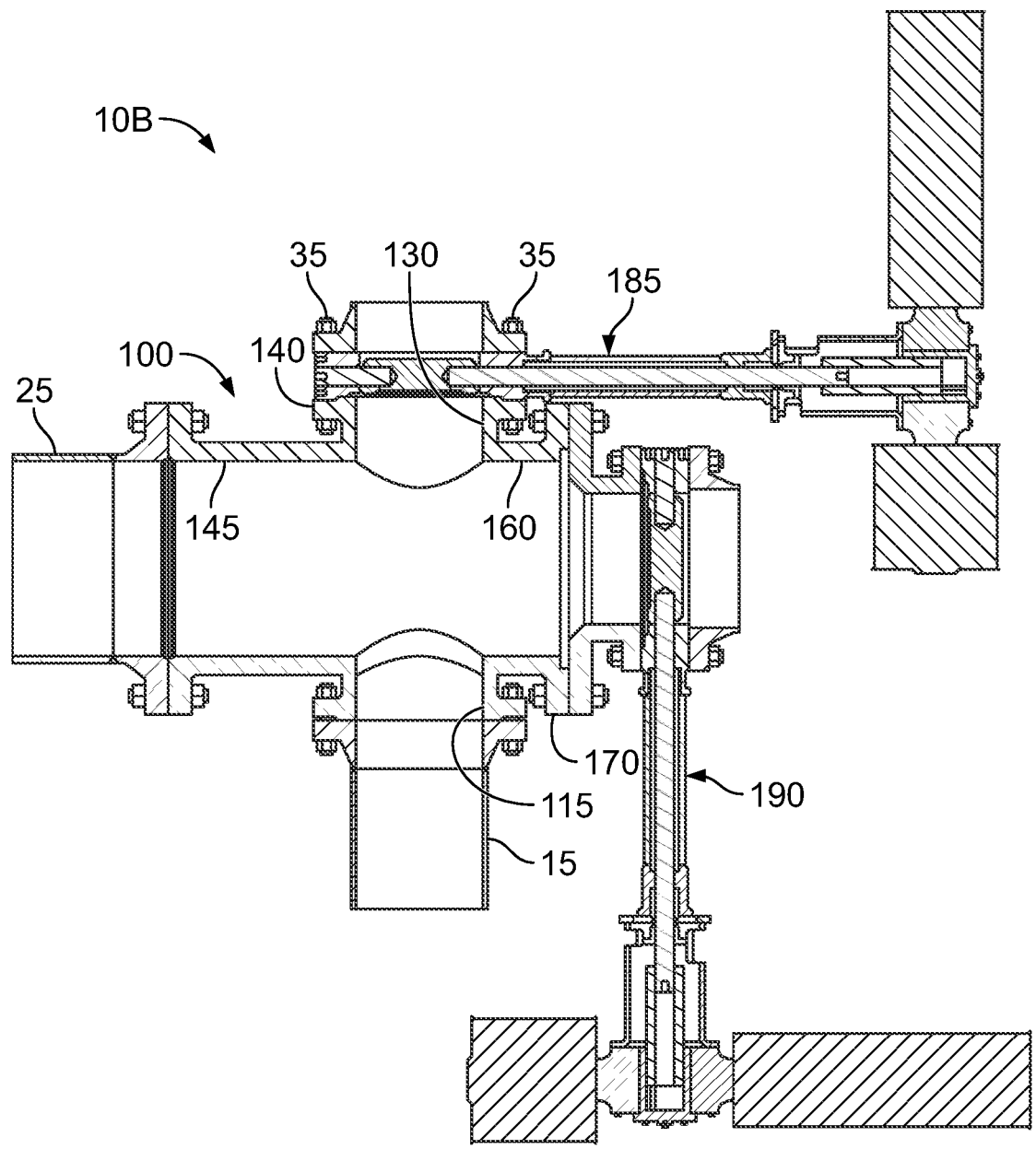
FIG. 4 is a side cross-sectional view of a second example pipe cleaning assembly including the connection fixture of FIG. 1.

Referring to FIG. 4, a second example pipe cleaning assembly 10B is shown that uses connection fixture 100 and can be used to clean the piping system by blowing out fluid and debris from first and/or second auxiliary aperture 130, 160, depending on the direction of flow of the fluid, and provides additional flow capacity. In the configuration shown in FIG. 4, both upstream and downstream piping can be blown out at the same time or the upstream or downstream piping can be blown out individually. As can be seen in FIG. 4, first valve 185, such as a butterfly valve or a ball valve, can be positioned over first auxiliary aperture 130 and connected to third connection flange 140 of connection fixture 100 to control fluid flow through first auxiliary aperture 130. In addition, a second valve 190, such as a butterfly valve or a ball valve, can be positioned over second auxiliary aperture 160 and connected to fourth connection flange 170 of connection fixture 100 to control fluid flow through second auxiliary aperture 160. Configured in this manner, first and second valves 185, 190 can be closed to allow the pressure in the piping system to be built up and then either or both valves can be quickly opened to allowed fluid and debris to be blown out of the piping system through first and/or second auxiliary apertures 130, 160.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. First valve 185 is then installed at first auxiliary aperture 130 and connected to third connection flange 140 and second valve 190 is installed at second auxiliary aperture 160 and connected to fourth connection flange 170. Once installed, first and second valves 185,190 are closed, the piping system is pressurized, and, once pressurized and the target pressure has been reached, first and/or second valve 185,190 is rapidly opened to depressurized the piping system at high flow rates and vent debris from the piping system to clean the piping system. This technique allows the piping system to be pressurized with a relatively small compressor and yet high flow rates can be achieved. Once the cleaning is complete, connection fixture 100 can be removed and the control valve can be installed between first pipe section 15 and second pipe section 25. This process allows the piping system to be cleaned without risking wear or damage to the control valve during the cleaning process.

Figure 5A:
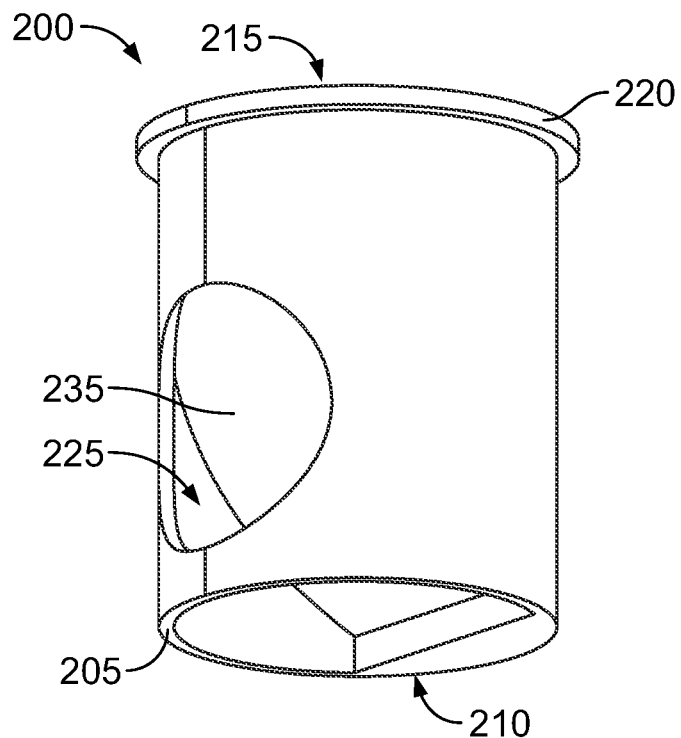
FIG. 5A is a perspective view of an example diverter trim that can be used with the connection fixture of FIG. 1.
Figure 5B:
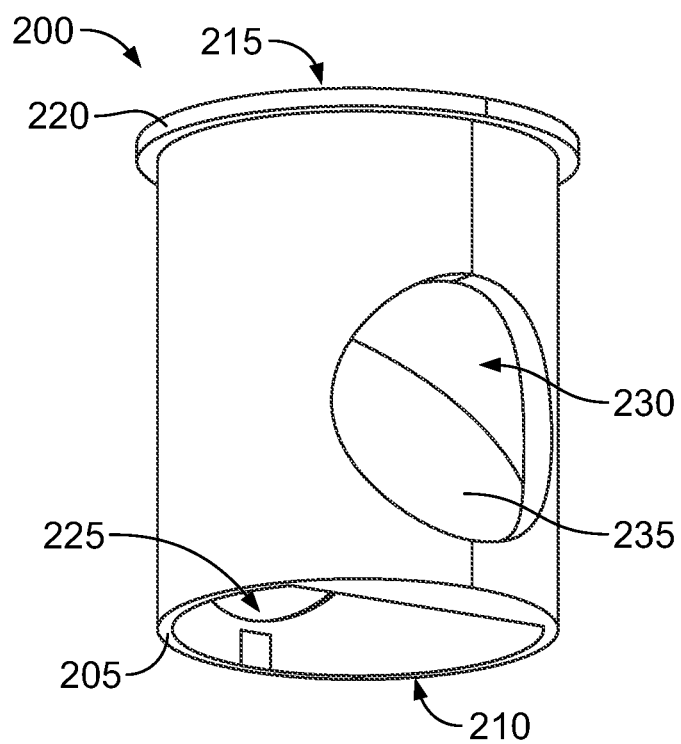
FIG. 5B is a another perspective view of the diverter trim of FIG. 5A.

Referring to FIGS. 5A and 5B, an example diverter trim 200 is shown that can also be used with connection fixture 100. Diverter trim 200 has a generally cylindrical wall 205 that has an open first end 210 and an open second end 215. A radially extending flange 220 extends from and surrounds second end 215 and can be used to seat diverter trim 200 in second auxiliary aperture 160 (see, e.g., FIG. 6). First and second openings 225, 230 are formed through wall 205, proximate first end 210, and coaxially aligned and positioned on opposite sides of wall 205. A wall 235, which in the example shown is planar, is positioned on the interior of wall 205 and extends across diverter trim 200 at an acute angle relative to an axis 240 of diverter trim 200. Wall 235 extends entirely across the interior of wall 205 of diverter trim 200 so that fluid flow is prevented between first and second openings 225, 230, fluid flow is allowed between first opening 225 and open first end 210, and fluid flow is allowed between second opening 230 and open second end 215, to direct fluid flowing through the connection fixture 100.

Diverter trim 200 can be manufactured as a separate parts and attached together or can be manufactured as one single, integral, unitary part using Additive Manufacturing Technology, such as direct metal laser sintering, full melt powder bed fusion, etc. Using an Additive Manufacturing Technology process, the 3-dimensional design of the desired structure is divided into multiple layers, for example layers approximately 20-50 microns thick. A powder bed, such as a powder based metal, is then laid down representing the first layer of the design and a laser or electron beam sinters together the design of the first layer. A second powder bed, representing the second layer of the design, is then laid down over the first sintered layer and the second layer is sintered together. This continues layer after layer to form the completed structure.

Figure 6:
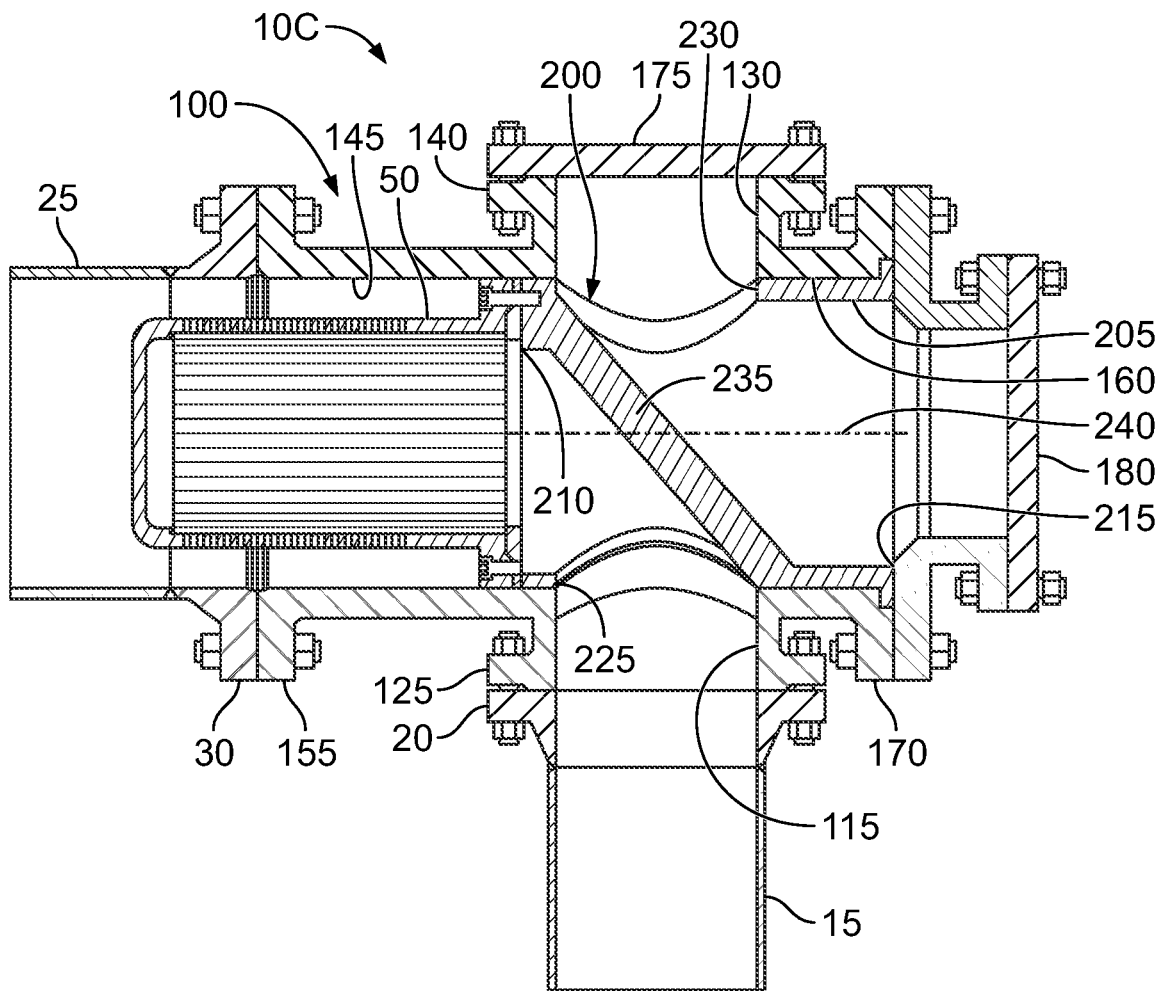
FIG. 6 is a side cross-sectional view of a third example pipe cleaning assembly including the connection fixture of FIG. 1 and the diverter trim of FIGS. 5A-B.

Referring to FIG. 6, a third example pipe cleaning assembly 10C is shown that uses connection fixture 100 and diverter trim 200 and can be used to clean the piping system. Use of diverter trim 200 effectively separates the upstream and downstream piping, allowing each section of piping to be pressurized and cleaned individually, which helps eliminate cross contamination between the two piping sections. In pipe cleaning assembly 100, diverter trim 200 is inserted through second auxiliary aperture 160 of connection fixture 100, is positioned within cavity 110 of body 105, and is secured in place by second plate 180 positioned over second auxiliary aperture 160. First plate 175 is also secured over first auxiliary aperture 130. Diverter trim 200 is positioned in a first position such that first opening 225 is generally aligned with first aperture 115 and open first end 210 is generally aligned with second aperture 145 so that wall 235 directs fluid flow through connection fixture 100 and diverter trim 200 directs fluid between first aperture 115 and second aperture 145 and prevents fluid flow to first and second auxiliary apertures 130, 160 due to the positioning of wall 235. In this configuration, the flow capacity of connection fixture 100 can be very high compared to a control valve because there is no restriction from a noise reduction trim. The high flow capacity of connection fixture 100 allows high pipeline velocities to be achieved which supports through pipe cleaning.

In some cases it may be desirable to filter the fluid flow through connection fixture 100, while preserving the high flow capacity, for example, to remove large debris from new piping systems during the commissioning phase. This can be achieved by positioning a filter 50 between diverter trim 200 and second aperture 145 to catch and trap debris in the fluid flowing through connection fixture 100. As shown, filter 50 is secured to first end 210 of diverter trim 200. Alternatively, filter 50 can be trapped between diverter trim 200 and a lip or shoulder formed in body 105, however, the formation of a lip or shoulder in body 105 could affect the ability to launch or receive pipeline scrapers, as discussed above. Filter 50 could be a drilled hole flow diffuser that is clamped in place between diverter trim 200 and body 105, which supports a cylindrical screen with very fine passages to safely remove debris within the piping system. A drilled hole flow diffuser is economical and readily available with a wide range of passage sizes. The length of the drilled hole flow diffuser can also be increased until the desired flow capacity is achieved. Alternatively, filter 50 can have an outer filter and an inner screen, which allows the filtering efficiency to be quickly and economically adjusted by simply adjusting the mesh size of the inner screen. Debris collected within filter 50 does no damage to connection fixture 100 and the passage size can be much finer than the passages within a control valve. Alternatively, the debris within filter 50 can be flushed from the system by rotating diverter trim 200 by 180 degrees and reversing the fluid flow to blow the debris out of first auxiliary aperture 130. Use of filter 50 makes inspection and cleaning of connection fixture 100 much quicker and more economical that using a temporary filter clamped between flanges, as is currently done. With filter 50, the cleanliness of the piping system can be more accurately assessed by trapping debris within connection fixture 100.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Diverter trim 200 is installed through second auxiliary aperture 160 and into cavity 110 of body 105 and is positioned such that wall 235 directs fluid between first aperture 115 and second aperture 145 and prevents fluid flow to first and second auxiliary apertures 130, 160. Filter 50 could also be installed between diverter trim 200 and second aperture 145 to catch and trap debris flowing through connection fixture 100, if desired. First and second plates 175, 180 can also be positioned over first and second auxiliary apertures 130, 160 and connected to third and fourth connection flanges 140, 170 to seal first and second auxiliary apertures 130, 160. Pressurized fluid then flows through piping system to clean the piping system. Once the cleaning is complete, connection fixture 100 can be removed and the control valve can be installed between first pipe section 15 and second pipe section 25. This process allows the piping system to be cleaned without risking wear or damage to the control valve during the cleaning process.

Figure 8:
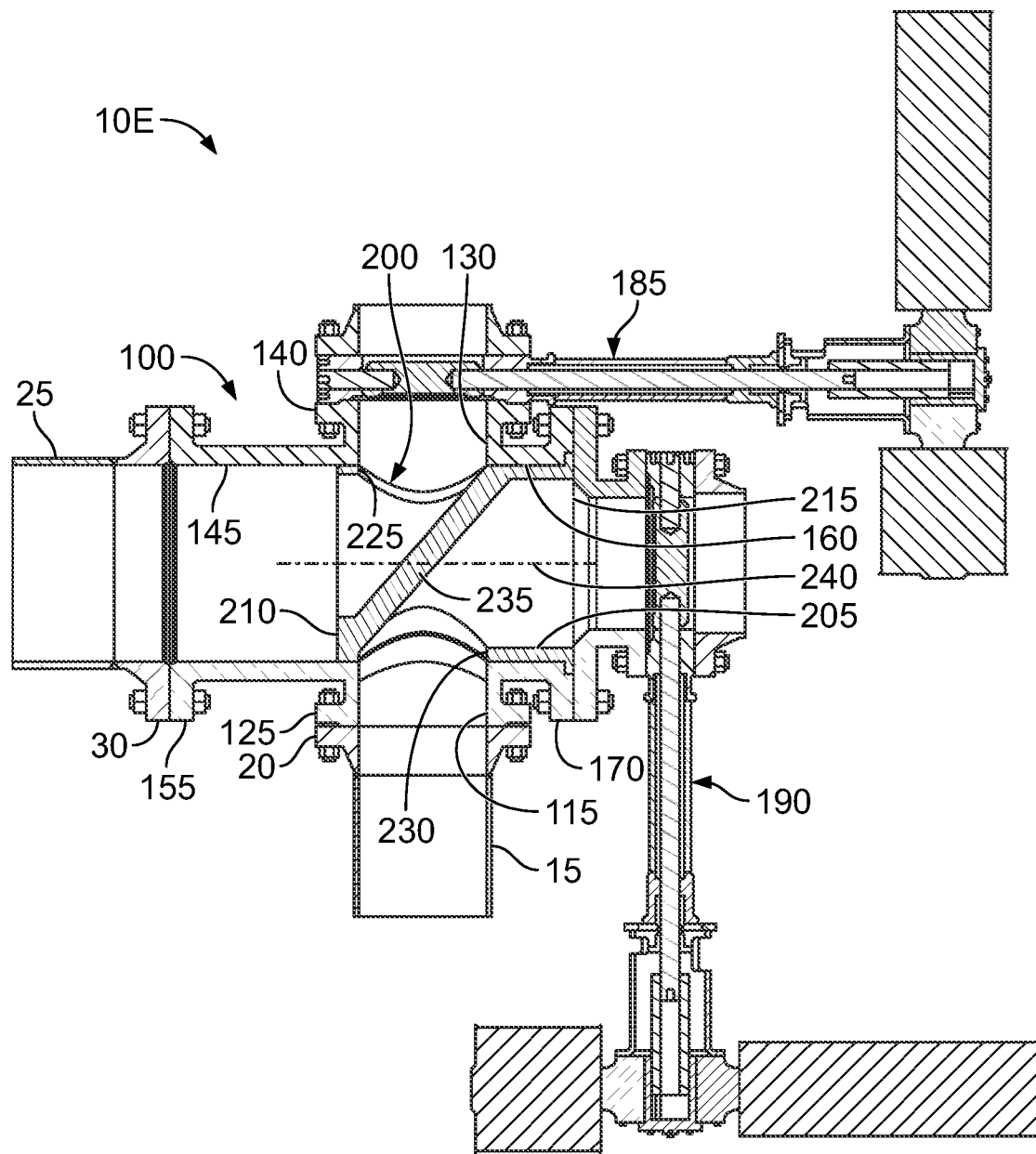
FIG. 8 is a side cross-sectional view of a fifth example pipe cleaning assembly including the connection fixture of FIG. 1 and the diverter trim of FIGS. 5A-B.
Figure 9:
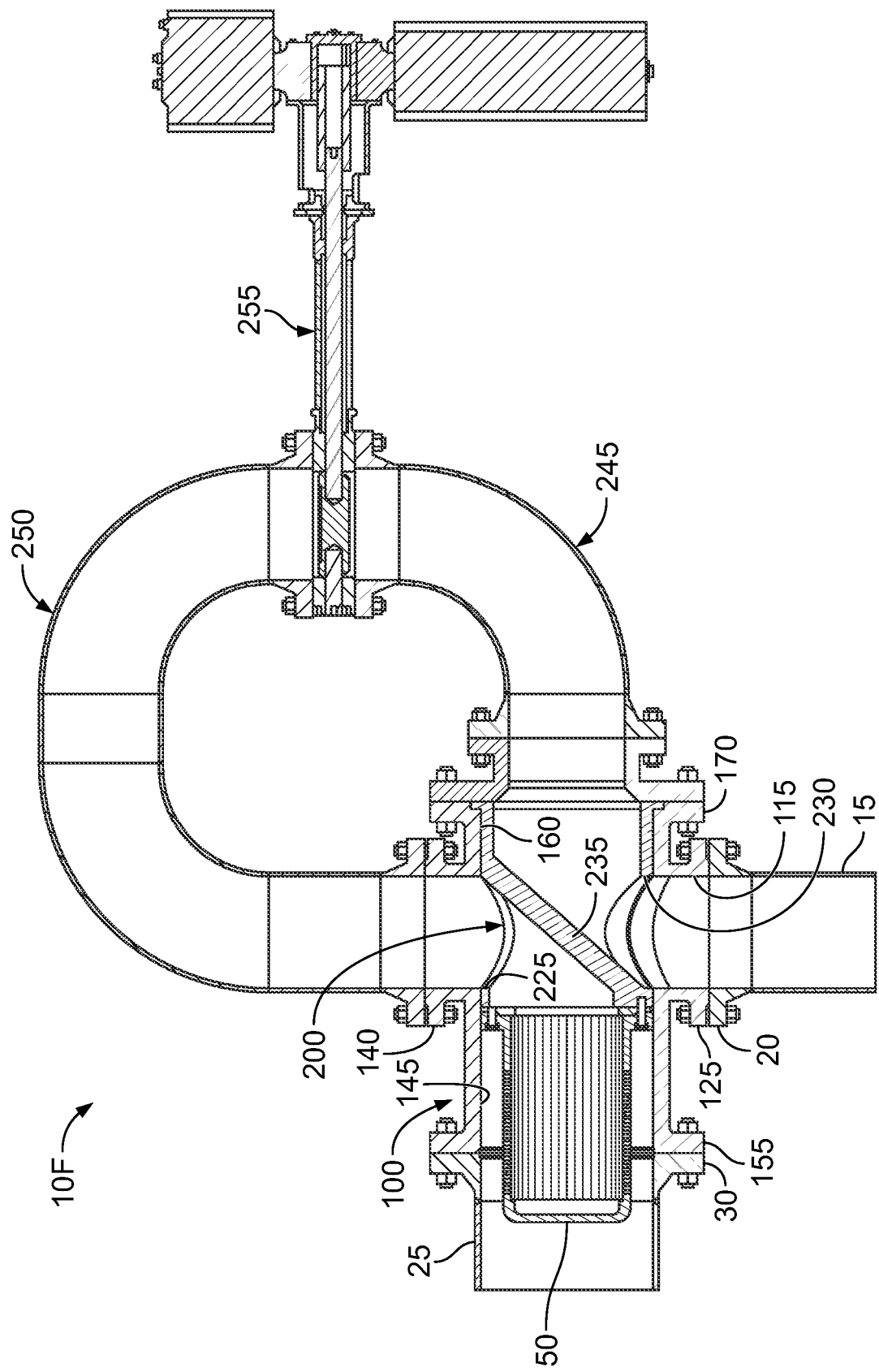
FIG. 9 is a side cross-sectional view of a sixth example pipe cleaning assembly including the connection fixture of FIG. 1 and the diverter trim of FIGS. 5A-B.

Rather than directing fluid flow from first aperture 115 to second aperture 145 as shown in FIG. 6, diverter trim 200 can be positioned in a second position such that first opening 225 is generally aligned with first auxiliary aperture 130, open first end 210 is generally aligned with second aperture 145, second opening 230 is generally aligned with first aperture 115, and open second end 215 is generally aligned with second auxiliary aperture 160 so that wall 235 directs fluid flow through connection fixture 100 and diverter trim 200 directs fluid between first aperture 115 and second auxiliary aperture 160 and between second aperture 145 and first auxiliary aperture 130. By simply rotating diverter trim 200 180 degrees, connection fixture 100 can be configured from a "flow through", as shown in FIG. 6, to a "flow out" configuration, as shown in FIGS. 7-9.

Figure 7:
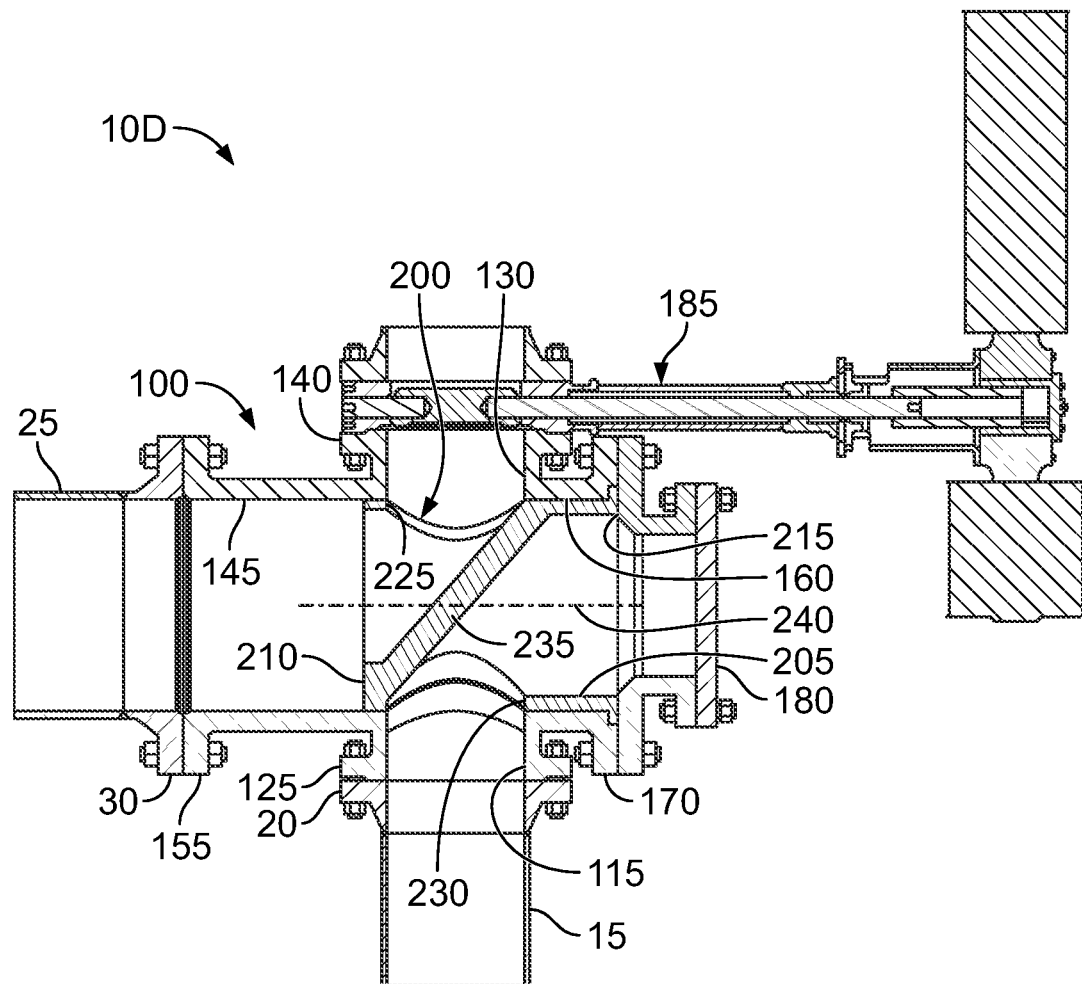
FIG. 7 is a side cross-sectional view of a fourth example pipe cleaning assembly including the connection fixture of FIG. 1 and the diverter trim of FIGS. 5A-B.

Referring to FIG. 7, a fourth example pipe cleaning assembly 10D is shown that uses connection fixture 100 and diverter trim 200 in the second position to clean the piping system. In pipe cleaning assembly 10D, second plate 180 is secured over second auxiliary aperture 160 to prevent fluid flow through first aperture 115. First valve 185 is positioned over first auxiliary aperture 130 and is connected to third connection flange 140 of connection fixture 100 to control fluid flow through from second aperture 145 through first auxiliary aperture 130. Configured in this manner, first valve 185 can be closed to allow the pressure in one side of the piping system to be built up and then first valve 185 can be quickly opened to allowed fluid and debris from second aperture 145 to be blown out of the piping system through first auxiliary aperture 130.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Diverter trim 200 is installed through second auxiliary aperture 160 and into cavity 110 of body 105 and is positioned such that wall 235 directs fluid between first aperture 115 and second auxiliary aperture 160 and between second aperture 145 and first auxiliary aperture 130. First valve 185 is installed at first auxiliary aperture 130 and connected to third connection flange 140 to control fluid flow through first auxiliary aperture 130 and second plate 180 is installed at second auxiliary aperture 160 and connected to fourth connection flange 170 to prevent fluid flow through second auxiliary aperture 160. Once installed, first valve 185 is closed, the piping system is pressurized, and, once pressurized, first valve 185 is opened to vent fluid and debris from the piping system through first auxiliary aperture 130 to clean the piping system. Once the cleaning is complete, connection fixture 100 can be removed and the control valve can be installed between first pipe section 15 and second pipe section 25. This process allows the piping system to be cleaned without risking wear or damage to the control valve during the cleaning process.

Alternatively, to clean the other side of the piping system, first plate 175 could be secured over first auxiliary aperture 130 to prevent fluid flow through second aperture 145 and second valve 190 positioned over second auxiliary aperture 160 and connected to fourth connection flange 170 of connection fixture 100 to control fluid flow through from first aperture 115 through second auxiliary aperture 160. Configured in this manner, second valve 190 can be closed to allow the pressure in the other side of the piping system to be built up and then second valve 190 can be quickly opened to allowed fluid and debris from first aperture 115 to be blown out of the piping system through second auxiliary aperture 160. Simply swapping first valve 185 at first auxiliary aperture 130 for second valve 190 at second auxiliary aperture 160 and second plate 180 at second auxiliary aperture 160 with first plate 175 at first auxiliary aperture 130 allows the user to select the piping system to be cleaned.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Diverter trim 200 is installed through second auxiliary aperture 160 and into cavity 110 of body 105 and is positioned such that wall 235 directs fluid between first aperture 115 and second auxiliary aperture 160 and between second aperture 145 and first auxiliary aperture 130. Second valve 190 is installed at second auxiliary aperture 160 and connected to fourth connection flange 170 to control fluid flow through second auxiliary aperture 160 and first plate 175 is installed at first auxiliary aperture 130 and connected to third connection flange 140 to prevent fluid flow through first auxiliary aperture 130. Once installed, second valve 190 is closed, the piping system is pressurized, and, once pressurized, second valve 190 is opened to vent fluid and debris from the piping system through second auxiliary aperture 160 to clean the piping system. Once the cleaning is complete, connection fixture 100 can be removed and the control valve can be installed between first pipe section 15 and second pipe section 25. This process allows the piping system to be cleaned without risking wear or damage to the control valve during the cleaning process.

Alternatively, both first and second valves 185, 190 could be mounted at first and second auxiliary apertures 130, 160 to minimize the time and labor required to switch between the two piping sections, as shown in FIG. 8 and described below.

Referring to FIG. 8, a fifth example pipe cleaning assembly 10E is shown that uses connection fixture 100 and diverter trim 200 in the second position to clean both sides of the piping system. In pipe cleaning assembly 10E, first valve 185 is positioned over first auxiliary aperture 130 and is connected to third connection flange 140 of connection fixture 100 to control fluid flow through from second aperture 145 through first auxiliary aperture 130 and second valve 190 positioned over second auxiliary aperture 160 and connected to fourth connection flange 170 of connection fixture 100 to control fluid flow through from first aperture 115 through second auxiliary aperture 160. Configured in this manner, first and second valves 185, 190 can be closed to allow the pressure in both sides of the piping system to be built up and then first and/or second valve 185, 190 can be quickly opened to allowed fluid and debris from second and/or first aperture 145, 115 to be blown out of the piping system through first and/or second auxiliary aperture 130, 160.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Diverter trim 200 is installed through second auxiliary aperture 160 and into cavity 110 of body 105 and is positioned such that wall 235 directs fluid between first aperture 115 and second auxiliary aperture 160 and between second aperture 145 and first auxiliary aperture 130. First valve 185 is installed at first auxiliary aperture 130 and connected to third connection flange 140 to control fluid flow through first auxiliary aperture 130 and second valve 190 is installed at second auxiliary aperture 160 and connected to fourth connection flange 170 to control fluid flow through second auxiliary aperture 160. Once installed, first and second valves 185, 190 are closed, the piping system is pressurized, and, once pressurized, first valve 185 is opened to vent fluid and debris from the piping system through first auxiliary aperture 130 and/or second valve 190 is opened to vent fluid and debris from the piping system through second auxiliary aperture 160 to clean the piping system. Once the cleaning is complete, connection fixture 100 can be removed and the control valve can be installed between first pipe section 15 and second pipe section 25. This process allows the piping system to be cleaned without risking wear or damage to the control valve during the cleaning process.

In some cases it may be advantageous to operate the process equipment, such as a pump or compressor, to perform the cleaning operation. In some cases, effective operation of the process equipment, such as a pump or compressor, to perform the cleaning operation may require the throttling function of the control valve that is replaced by connection fixture 100 during the cleaning process.

Referring to FIG. 9, a sixth example pipe cleaning assembly 10F is shown that uses connection fixture 100 and diverter trim 200 in the second position to clean the piping system and provides both the throttling function and the filtering function while the process equipment is operated. In pipe cleaning assembly 10F, a first diverter pipe 245 is positioned over second auxiliary aperture 160 and is connected to fourth connection flange 170 of connection fixture 100 and in fluid communication with second auxiliary aperture 160. Similarly, a second diverter pipe 250 is positioned over first auxiliary aperture 130 and is connected to third connection flange 140 of connection fixture 100 and in fluid communication with first auxiliary aperture 130. A valve 255, such as a butterfly valve or a ball valve, is positioned between first diverter pipe 245 and second diverter pipe 250 to control the flow of fluid from first diverter pipe 245 to second diverter pipe 250. Configured in this manner, the fluid flow between first aperture 115 and second aperture 145 can be controlled as needed to best suit the particular system and cleaning method being used.

If desired, filter 50 can also be positioned between diverter trim 200 and second aperture 145 to catch and trap debris in the fluid flowing through connection fixture 100, as described above.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. First diverter pipe 245 is installed at second auxiliary aperture 160 and is connected to fourth connection flange 170, second diverter pipe 250 is installed at first auxiliary aperture 130 and is connected to third connection flange 140, and valve 255 is positioned between and connected to first and second diverter pipes 245, 250. Filter 50 could also be installed between diverter trim 200 and second aperture 145 to catch and trap debris flowing through connection fixture 100, if desired. Once installed, valve 255 is closed, the piping system is pressurized, and, once pressurized, valve 255 is opened to clean the piping system. In addition, valve 255 can also be used to throttle the flow of fluid through connection fixture 100 during the cleaning process. Once the testing and/or cleaning is complete, connection fixture 100 can be removed and the control valve can be installed between first pipe section 15 and second pipe section 25. This process allows the piping system to be cleaned without risking wear or damage to the control valve during the cleaning process.

Figure 10:
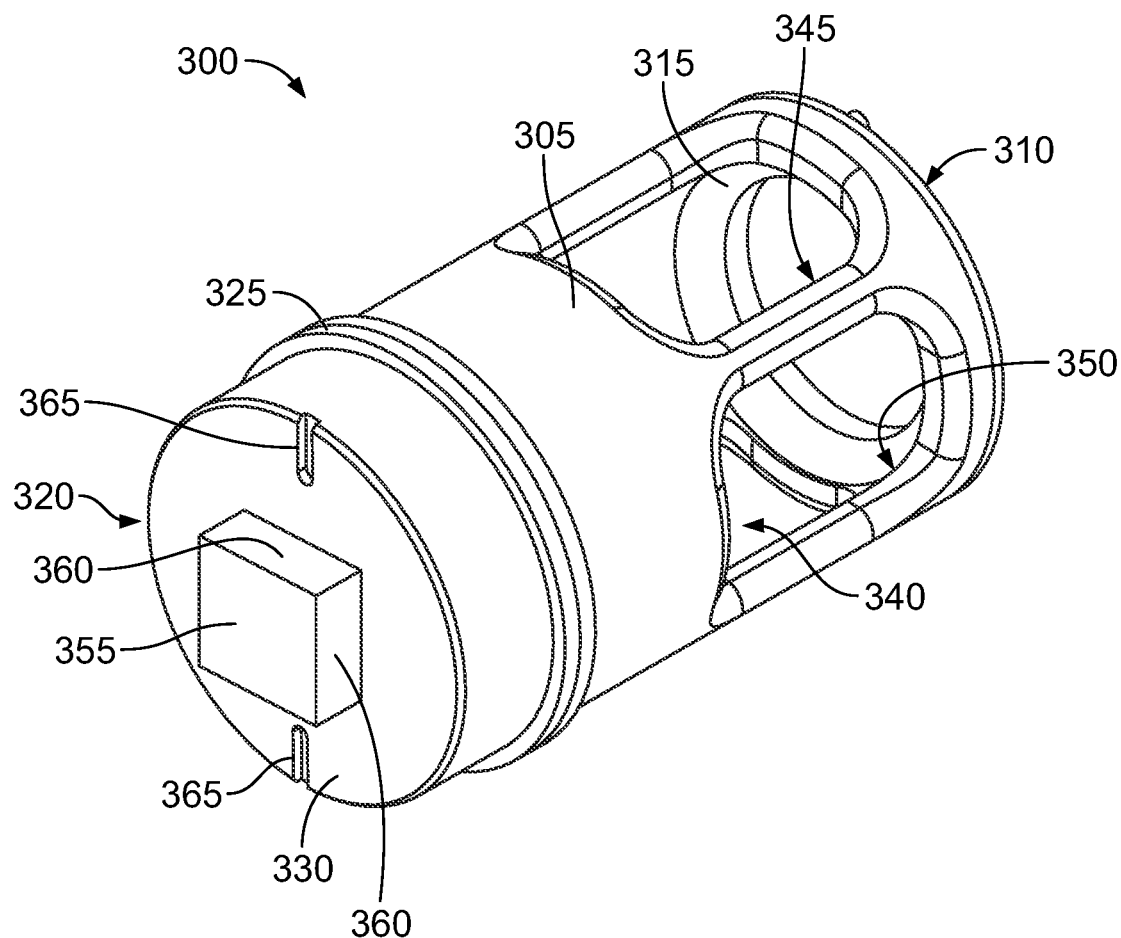
FIG. 10 is a perspective view of an example bonnet that can be used with the connection fixture of FIG. 1.

Referring to FIG. 10, an example bonnet 300 is shown that can also be used with connection fixture 100. Bonnet 300 has a generally cylindrical wall 305 that has an open first end 310 that forms a valve seat 315 and a closed second end 320 that is closed off by end wall 330. The outside diameter of wall 305 of bonnet 300 is closely matched to the inside diameter of second auxiliary aperture 160 of connection fixture 100. This minimal clearance provides adequate sealing of debris between body 105 of connection fixture 100 and bonnet 300. A radially extending flange 325 extends from and surrounds second end 320 and can be used to seat bonnet 300 in second auxiliary aperture 160 and secure bonnet 300 to fourth connection flange 170 (see, e.g., FIG. 11). A plurality of openings are formed through wall 305, proximate first end 310, to direct fluid flowing through connection fixture 100. In the example shown, the plurality of openings include a first opening 340, a second opening 345 aligned with first opening 340 on an opposite side of wall 305, and a third opening 350 positioned between and aligned generally perpendicular to first opening 340 and second opening 345. A protrusion 355 extends from an external surface of end wall 330 and has one or more planar surfaces 360, which are configured to engage a tool to enable bonnet 300 to be rotated within connection fixture 100 without removing bonnet 300 from connection fixture 100, which provides a quicker, easier, and more economical selection of a cleaning mode, preferably by rotating bonnet 300 within connection fixture 100 in 90 degree increments. Bonnet 300 can also have one or more external indicators 365, for example on the external surface of end wall 330, that allow for positive external identification of the position of first, second, and third openings 340, 345, 350, and, therefore, the cleaning mode selected, without having to move bonnet 300 from connection fixture 100. In addition to, or instead of, external indicators 365, bonnet 300 could include a detent or locking mechanism to assist in the accurate positioning of bonnet 300 within connection fixture 100 so that first, second, and third openings 340, 345, 350 align correctly with the respective apertures in connection fixture 100.

Bonnet 300 can be manufactured as a separate parts and attached together or can be manufactured as one single, integral, unitary part using Additive Manufacturing Technology, as described above.

In some cases, it may also be desirable to limit the flow rate through connection fixture 100. In addition to selecting the cleaning mode, bonnet 300 can be rotated within connection fixture 100 to adjust the maximum $C_v$ and offset first, second, and third openings 340, 345, 350, from the apertures to create a restriction between bonnet 300 and connection fixture 100. This mode of flow limitation is available without needing a pneumatic actuator which is a significant cost savings.

Figure 11:
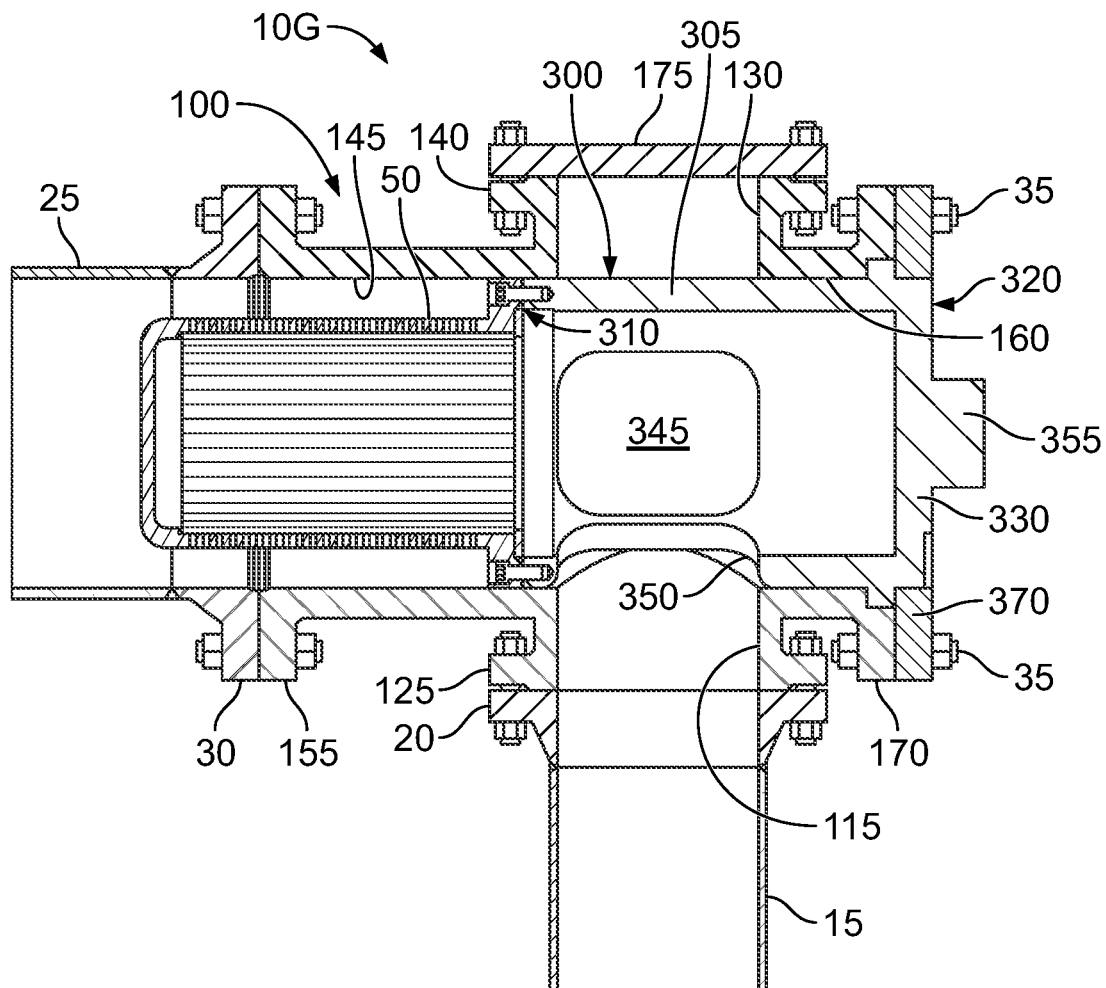
FIG. 11 is a side cross-sectional view of a seventh example pipe cleaning assembly including the connection fixture of FIG. 1 and the bonnet of FIG. 10.

Referring to FIG. 11, a seventh example pipe cleaning assembly 10G is shown that uses connection fixture 100 and bonnet 300 and can be used to clean the piping system. In pipe cleaning assembly 10G, bonnet 300 is inserted through second auxiliary aperture 160 of connection fixture 100, is positioned within cavity 110 of body 105, and is secured in place by a ring plate 370 that is connected to fourth connection flange 170 and secures flange 325 between body 105 and ring plate 370. First plate 175 is also secured over first auxiliary aperture 130. Bonnet 300 is positioned in a first position such that third opening 350 is generally aligned with first aperture 115, first and second openings 340, 345 are blocked by body 105, and open first end 310 is generally aligned with second aperture 145 so that bonnet 300 directs fluid between first aperture 115 and second aperture 145 and prevents fluid flow to first and second auxiliary apertures 130, 160.

If desired, filter 50 can also be positioned between bonnet 300 and second aperture 145 to catch and trap debris in the fluid flowing through connection fixture 100, as described above. Except, in this example, filter 50 is secured to first end 310 of bonnet 300, rather than diverter trim 200.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Bonnet 300 is installed through second auxiliary aperture 160 and into cavity 110 of body 105 and is positioned in the first position such that bonnet 300 directs fluid between first aperture 115 and second aperture 145 and prevents fluid flow to first and second auxiliary apertures 130, 160. Ring plate 370 is then connected to fourth connection flange 170 to secure bonnet 300 within connection fixture 100 and first plate 175 is positioned over first auxiliary aperture 130 and connected to third connection flange 140 to seal first auxiliary aperture 130. If already installed, threaded members 35 can be loosened, without removing ring plate 370, bonnet 300 is then rotated within connection fixture 100 to the desired position, without removing bonnet 300 from the connection fixture 100, and threaded members 35 are tightened secure ring plate 370 and position bonnet 300 in the first position. Filter 50 could also be installed between bonnet 300 and second aperture 145 to catch and trap debris flowing through connection fixture 100, if desired. Pressurized fluid then flows through piping system to clean the piping system. Once the cleaning is complete, connection fixture 100 can be removed and the control valve can be installed between first pipe section 15 and second pipe section 25. This process allows the piping system to be cleaned without risking wear or damage to the control valve during the cleaning process.

Figure 12:
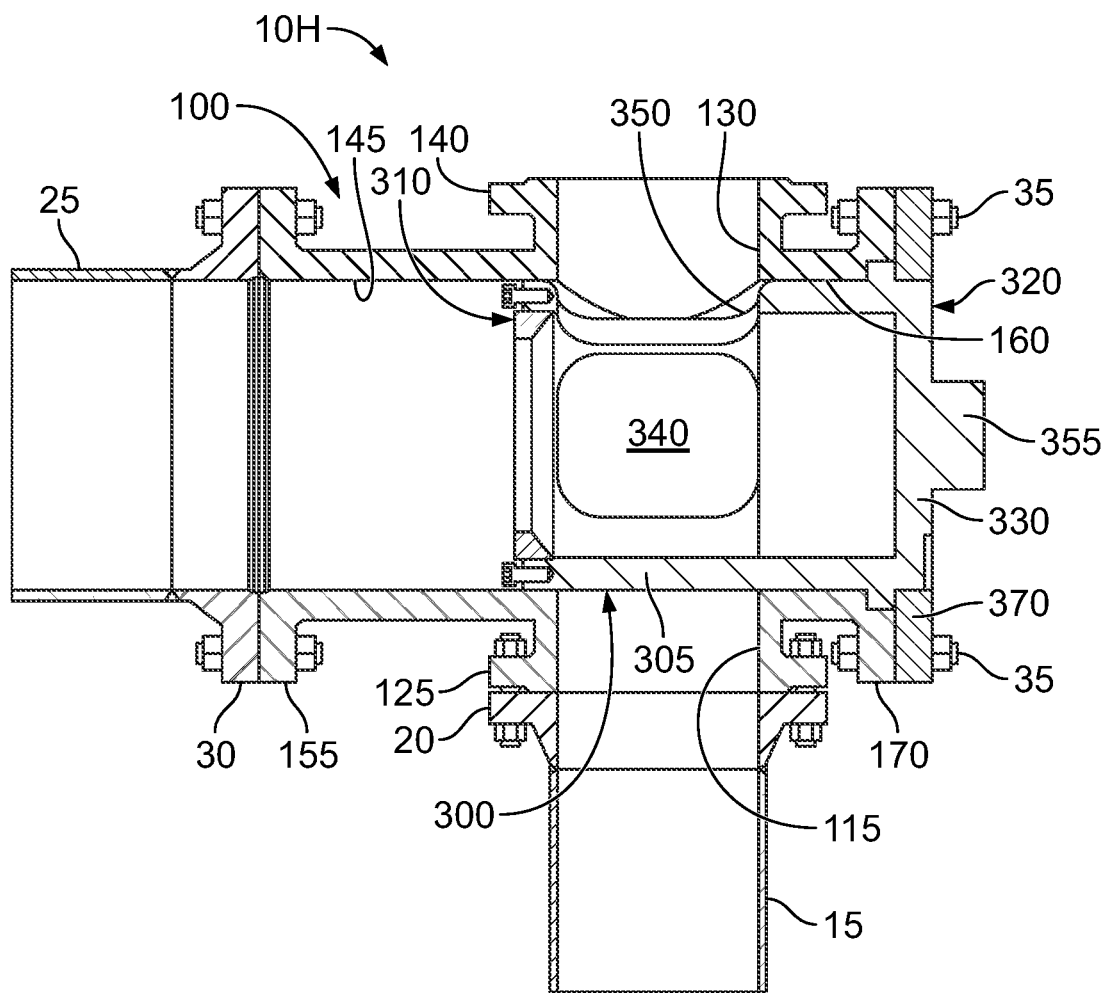
FIG. 12 is a side cross-sectional view of an eighth example pipe cleaning assembly including the connection fixture of FIG. 1 and the bonnet of FIG. 10.

Referring to FIG. 12, an eighth example pipe cleaning assembly 10H is shown that uses connection fixture 100 and bonnet 300 and can be used to clean the piping system. In pipe cleaning assembly 10H, bonnet 300 is also inserted through second auxiliary aperture 160 of connection fixture 100, is positioned within cavity 110 of body 105, and is secured in place by a ring plate 370, as described above. Bonnet 300 is positioned in a second position such that third opening 350 is generally aligned with first auxiliary aperture 130, first and second openings 340, 345 are blocked by body 105, and open first end 310 is generally aligned with second aperture 145 so that bonnet 300 directs fluid between second aperture 145 and first auxiliary aperture 130 and prevents fluid flow to first aperture 115 and second auxiliary aperture 160.

Although not shown in FIG. 12, filter 50 can also be positioned between bonnet 300 and second aperture 145 to catch and trap debris in the fluid flowing through connection fixture 100, as described above.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Bonnet 300 is installed through second auxiliary aperture 160 and into cavity 110 of body 105 and is positioned in the second position such that bonnet 300 directs fluid between second aperture 145 and first auxiliary aperture 130 and prevents fluid flow to first aperture 115 and second auxiliary aperture 160. Ring plate 370 is then connected to fourth connection flange 170 to secure bonnet 300 within connection fixture 100. If already installed, threaded members 35 can be loosened, without removing ring plate 370, bonnet 300 is then rotated within connection fixture 100 to the desired position, without removing bonnet 300 from the connection fixture 100, and threaded members 35 are tightened secure ring plate 370 and position bonnet 300 in the second position. Filter 50 could also be installed between bonnet 300 and second aperture 145 to catch and trap debris flowing through connection fixture 100, if desired. Pressurized fluid then flows through piping system to clean the piping system. Once the cleaning is complete, connection fixture 100 can be removed and the control valve can be installed between first pipe section 15 and second pipe section 25. This process allows the piping system to be cleaned without risking wear or damage to the control valve during the cleaning process.

Figure 13:
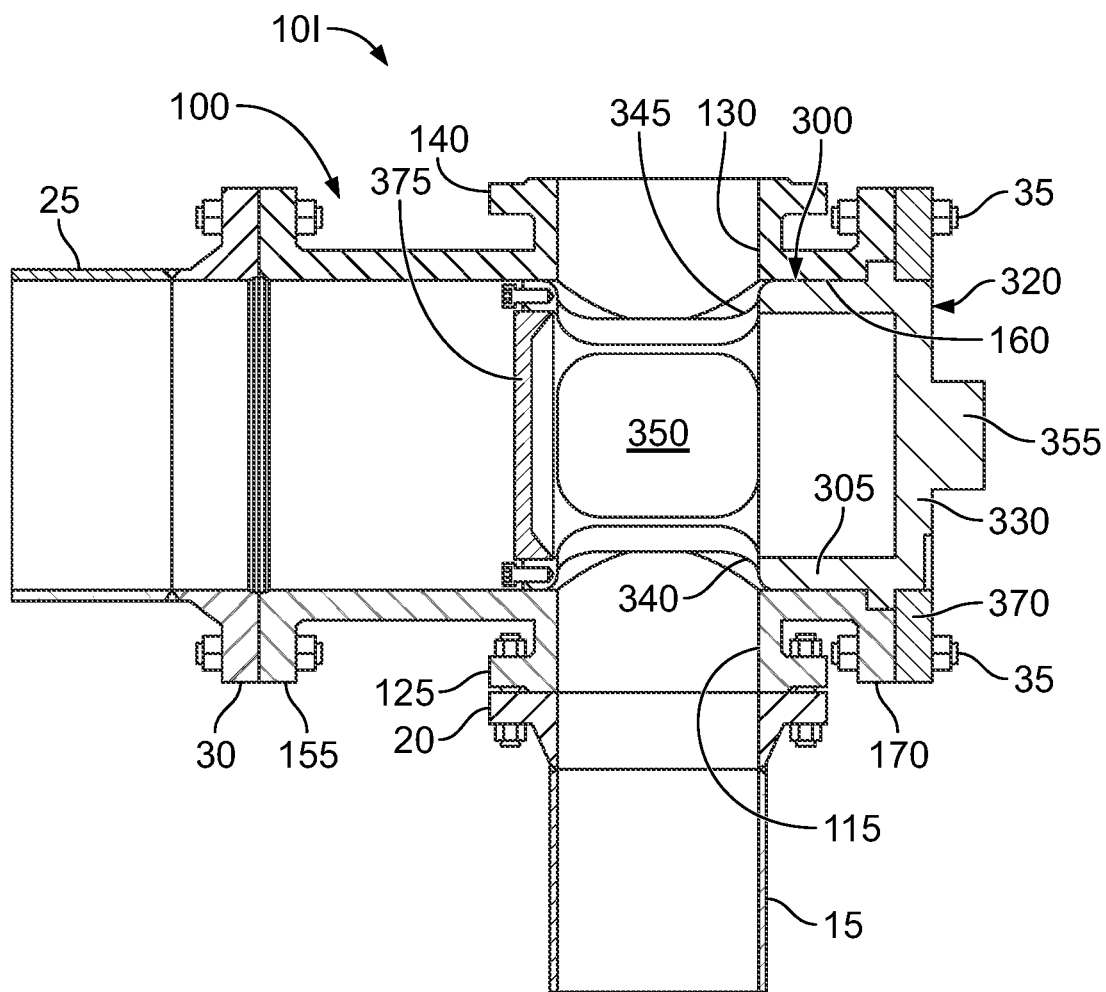
FIG. 13 is a side cross-sectional view of a ninth example pipe cleaning assembly including the connection fixture of FIG. 1 and the bonnet of FIG. 10.

Referring to FIG. 13, a ninth example pipe cleaning assembly 10I is shown that uses connection fixture 100 and bonnet 300 and can be used to clean the piping system. In pipe cleaning assembly 10I, bonnet 300 is also inserted through second auxiliary aperture 160 of connection fixture 100, is positioned within cavity 110 of body 105, and is secured in place by a ring plate 370, as described above. Bonnet 300 is positioned in a third position such that first opening 340 is generally aligned with first aperture 115, second opening 345 is generally aligned with first auxiliary aperture 130, third opening 350 is blocked by body 105 to direct fluid between first aperture 115 and first auxiliary aperture 130 and prevent fluid flow through second auxiliary aperture 160. A plate 375 is also secured to bonnet 300 at first end 310 to prevent fluid flow through open first end 310 of bonnet 300 and through second aperture 145.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Plate 375 is secured to first end 310 of bonnet 300 to prevent fluid flow through open first end 310 of bonnet 300 and second aperture 145. Bonnet 300 is installed through second auxiliary aperture 160 and into cavity 110 of body 105 and is positioned in the third position such that bonnet 300 directs fluid between first aperture 115 and first auxiliary aperture 130 and prevents fluid flow to second auxiliary aperture 160. Ring plate 370 is then connected to fourth connection flange 170 to secure bonnet 300 within connection fixture 100. If already installed, threaded members 35 can be loosened, without removing ring plate 370, bonnet 300 is then rotated within connection fixture 100 to the desired position, without removing bonnet 300 from the connection fixture 100, and threaded members 35 are tightened secure ring plate 370 and position bonnet 300 in the third position. Pressurized fluid then flows through piping system to clean the piping system. Once the cleaning is complete, connection fixture 100 can be removed and the control valve can be installed between first pipe section 15 and second pipe section 25. This process allows the piping system to be cleaned without risking wear or damage to the control valve during the cleaning process.

Figure 14:
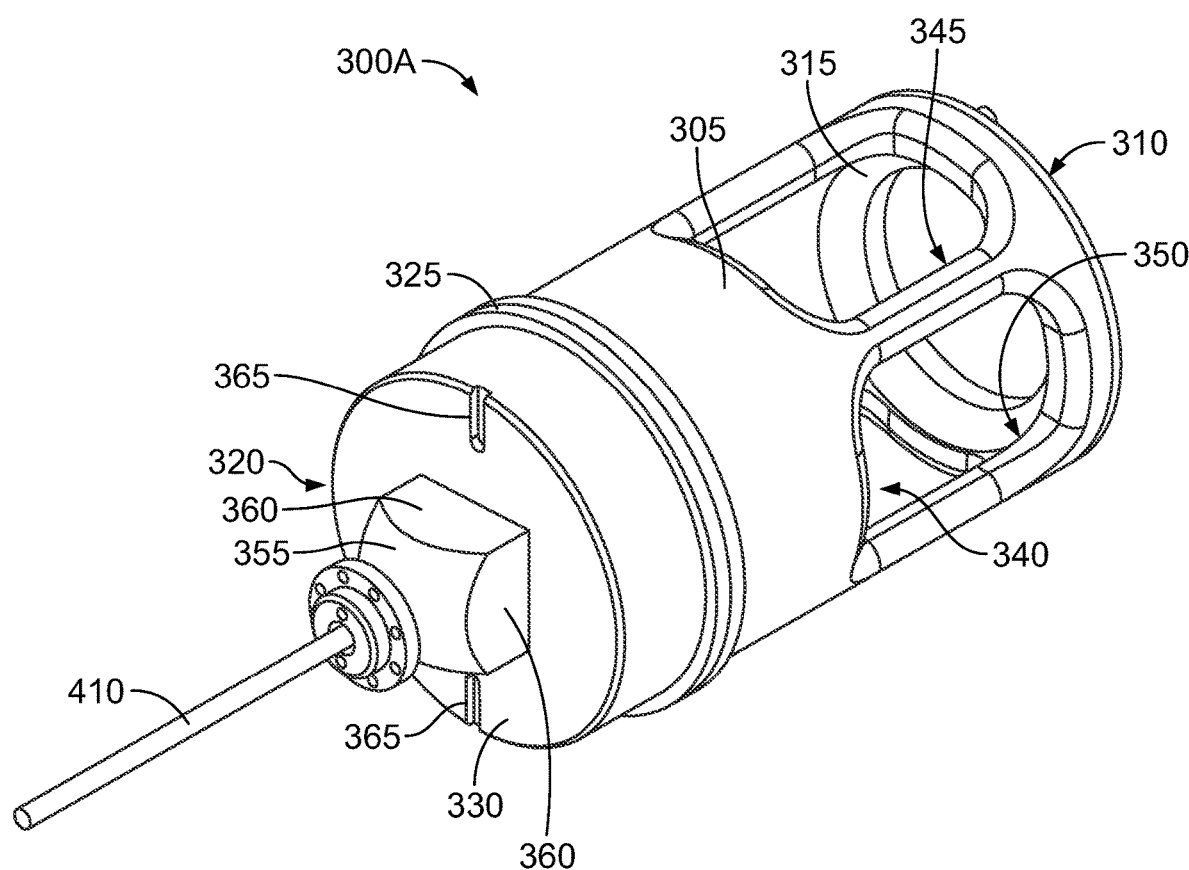
FIG. 14 is perspective view of another example bonnet that can be used with the connection fixture of FIG. 1.

Referring to FIG. 14, an example bonnet assembly 400 is shown that includes a bonnet 300A, actuator 405, and valve plug 415 and can also be used with connection fixture 100 to clean a piping system. Bonnet assembly 400 provides throttling control of the fluid flow through connection fixture 100 in all cleaning modes and provides rapid opening in all cleaning modes to temporarily create high pressure and velocity to improved cleaning. Bonnet 300A is the same as bonnet 300 described in detail above, except that bonnet 300A has an opening 335 formed in end wall 330 to receive actuator shaft 410 of actuator 405 therethrough. Actuator 405 is mounted to bonnet 300A, for example to protrusion 355 of bonnet 300A (see, e.g., FIG. 15), and has actuator shaft 410 that extends through opening 335 in end wall 330 of bonnet 300A. Actuator 405 can be any type of manual or automatic actuator that can move actuator shaft 410 linearly along a longitudinal axis of actuator shaft 410. Valve plug 415 is secured to an end of actuator shaft 410 and is positioned within bonnet 300A such that valve plug 415 is movable within bonnet 300A between a first position, in which valve plug 415 is spaced apart from valve seat 315 of bonnet 300A and allows fluid flow through bonnet 300A (see, e.g., FIG. 15), and a second position, in which valve plug 415 is in contact with valve seat 315 and prevents fluid flow through bonnet 300A. In addition to the first (open) and second (closed) positions, valve plug 415 can also be positioned in any number of intermediate positions between the first and second positions to limit the flow rate through connection fixture 100.

Figure 15:
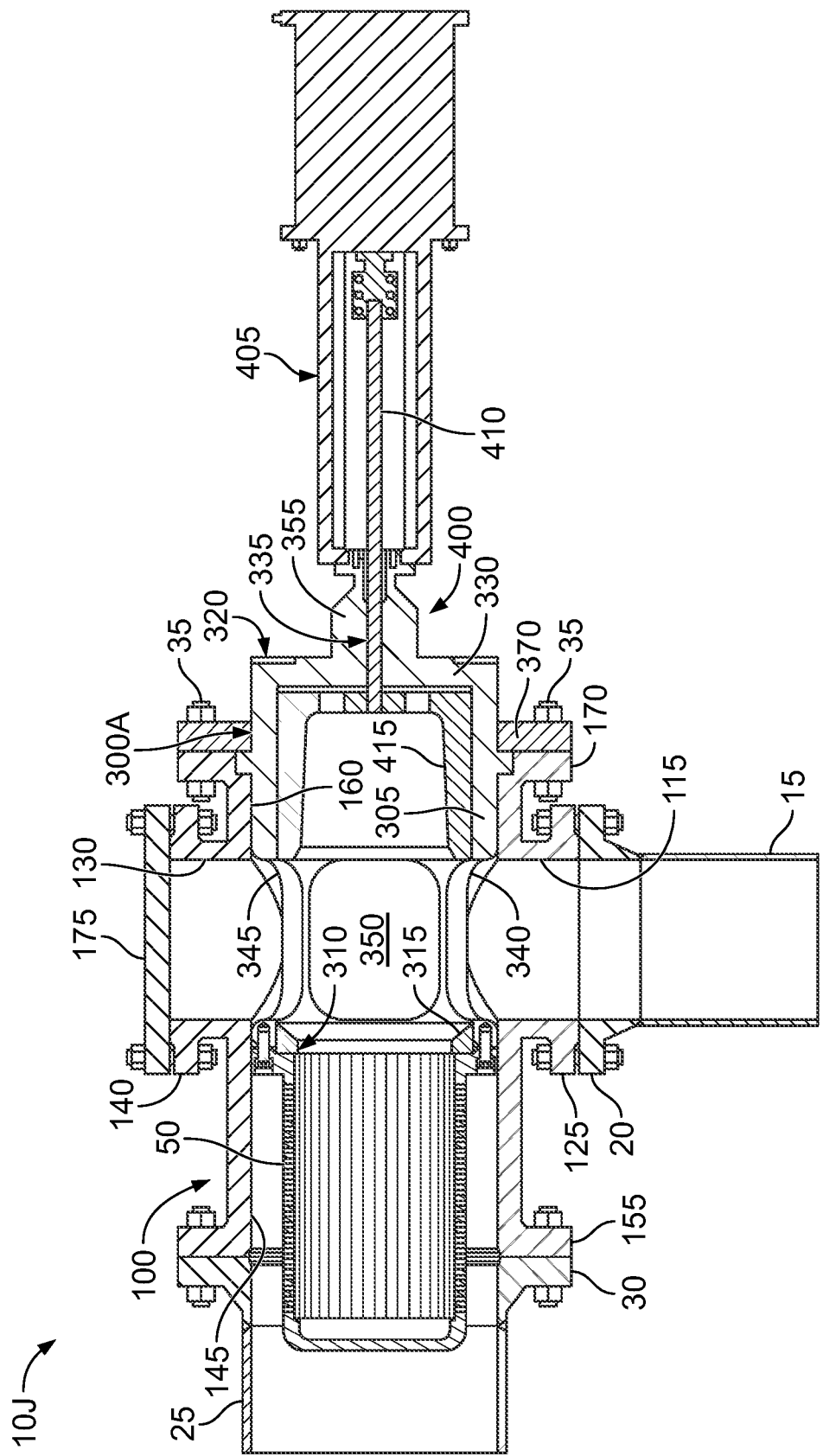
FIG. 15 is a side cross-sectional view of a tenth example pipe cleaning assembly including the connection fixture of FIG. 1 and the bonnet of FIG. 14.

Referring to FIG. 15, a tenth example pipe cleaning assembly 10J is shown that uses connection fixture 100 and bonnet assembly 400 and can be used to clean the piping system. In pipe cleaning assembly 10J, bonnet 300A of bonnet assembly 400 is inserted through second auxiliary aperture 160 of connection fixture 100, is positioned within cavity 110 of body 105, and is secured in place by a ring plate 370 that is connected to fourth connection flange 170 and secures flange 325 between body 105 and ring plate 370. First plate 175 is also secured over first auxiliary aperture 130 to prevent fluid flow through first auxiliary aperture 130. Bonnet 300A can be positioned in the first position such that third opening 350 is generally aligned with first aperture 115, first and second openings 340, 345 are blocked by body 105, and open first end 310 is generally aligned with second aperture 145 or the third position such that first opening 340 is generally aligned with first aperture 115, second opening 345 is generally aligned with first auxiliary aperture 130, third opening 350 is blocked by body 105 so that bonnet 300A directs fluid between first aperture 115 and second aperture 145 and prevents fluid flow to second auxiliary aperture 160. In the first position, bonnet 300A will also prevent fluid flow through first auxiliary aperture 130.

If desired, filter 50 can also be positioned between bonnet 300 and second aperture 145 to catch and trap debris in the fluid flowing through connection fixture 100, as described above.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Valve plug 415 is installed within bonnet 300A such that valve plug 415 is movable within bonnet 300A, as described above. Actuator 405 is mounted to bonnet 300A such that actuator shaft 410 extends through opening 335 in end wall 330 and actuator shaft 410 is secured to valve plug 415 to move valve plug 415 within bonnet 300A. Bonnet 300A is installed through second auxiliary aperture 160 and into cavity 110 of body 105 and is positioned in the first or third position such that bonnet 300A directs fluid between first aperture 115 and second aperture 145 and prevents fluid flow to second auxiliary aperture 160. If positioned in the first position, bonnet 300A also prevents fluid flow to first auxiliary aperture 130. If positioned in the third position, first plate 175 is positioned over first auxiliary aperture 130 and connected to third connection flange 140 to seal first auxiliary aperture 130. Ring plate 370 is then connected to fourth connection flange 170 to secure bonnet 300A within connection fixture 100. If already installed, threaded members 35 can be loosened, without removing ring plate 370, bonnet 300A is then rotated within connection fixture 100 to the desired position, without removing bonnet 300A from the connection fixture 100, and threaded members 35 are tightened secure ring plate 370 and position bonnet 300A in the first or third position. Filter 50 could also be installed between bonnet 300A and second aperture 145 to catch and trap debris flowing through connection fixture 100, if desired. Valve plug 415 is moved to the second (closed) position until a pressure within the piping system reaches a predetermined pressure. Once the predetermined pressure has been reached, valve plug 415 is moved to first (open) position to allow pressurized fluid to flow through the piping system to clean the piping system. Once the cleaning is complete, connection fixture 100 can be removed and the control valve can be installed between first pipe section 15 and second pipe section 25. This process allows the piping system to be cleaned without risking wear or damage to the control valve during the cleaning process.

Figure 16:
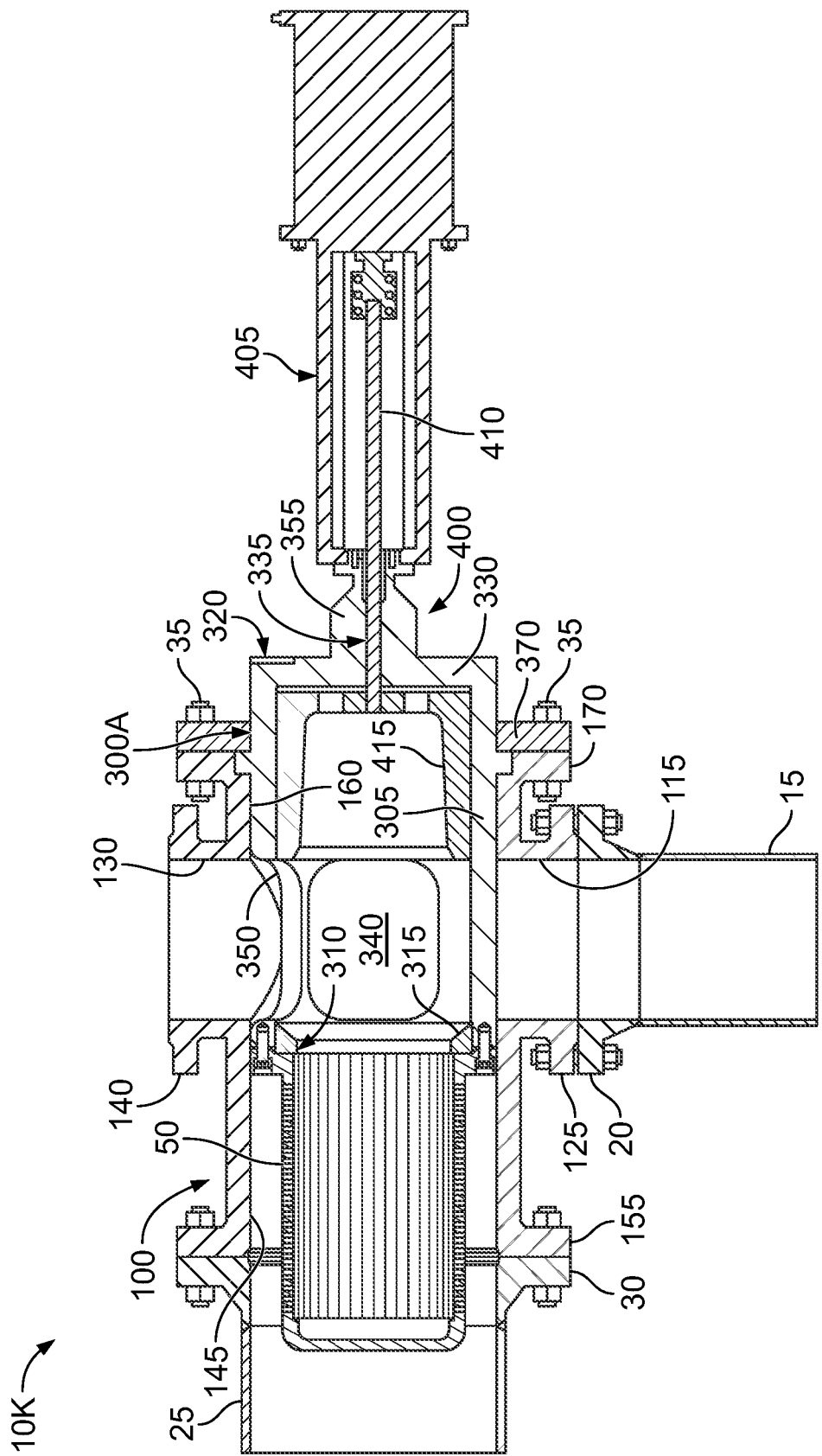
FIG. 16 is a side cross-sectional view of an eleventh example pipe cleaning assembly including the connection fixture of FIG. 1 and the bonnet of FIG. 14.

Referring to FIG. 16, an eleventh example pipe cleaning assembly 10K is shown that uses connection fixture 100 and bonnet assembly 400 and can be used to clean the piping system. In pipe cleaning assembly 10K, bonnet 300A of bonnet assembly 400 is inserted through second auxiliary aperture 160 of connection fixture 100, is positioned within cavity 110 of body 105, and is secured in place by ring plate 370, as described above. Bonnet 300A is positioned in the second position such that third opening 350 is generally aligned with first auxiliary aperture 130, first and second openings 340, 345 are blocked by body 105, and open first end 310 is generally aligned with second aperture 145 so that bonnet 300 directs fluid between second aperture 145 and first auxiliary aperture 130 and prevents fluid flow to first aperture 115 and second auxiliary aperture 160.

If desired, filter 50 can also be positioned between bonnet 300 and second aperture 145 to catch and trap debris in the fluid flowing through connection fixture 100, as described above.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Valve plug 415 is installed within bonnet 300A such that valve plug 415 is movable within bonnet 300A, as described above. Actuator 405 is mounted to bonnet 300A such that actuator shaft 410 extends through opening 335 in end wall 330 and actuator shaft 410 is secured to valve plug 415 to move valve plug 415 within bonnet 300A. Bonnet 300A is installed through second auxiliary aperture 160 and into cavity 110 of body 105 and is positioned in the second position such that bonnet 300A directs fluid between second aperture 145 and first auxiliary aperture 130 and prevents fluid flow to first aperture 115 and second auxiliary aperture 160. Ring plate 370 is then connected to fourth connection flange 170 to secure bonnet 300A within connection fixture 100. If already installed, threaded members 35 can be loosened, without removing ring plate 370, bonnet 300 is then rotated within connection fixture 100 to the desired position, without removing bonnet 300 from the connection fixture 100, and threaded members 35 are tightened secure ring plate 370 and position bonnet 300 in the second position. Filter 50 could also be installed between bonnet 300A and second aperture 145 to catch and trap debris flowing through connection fixture 100, if desired. Valve plug 415 is moved to the second (closed) position until a pressure within the piping system reaches a predetermined pressure. Once the predetermined pressure has been reached, valve plug 415 is moved to first (open) position to allow pressurized fluid to flow through the piping system to clean the piping system. Once the cleaning is complete, connection fixture 100 can be removed and the control valve can be installed between first pipe section 15 and second pipe section 25. This process allows the piping system to be cleaned without risking wear or damage to the control valve during the cleaning process.

Figure 17:
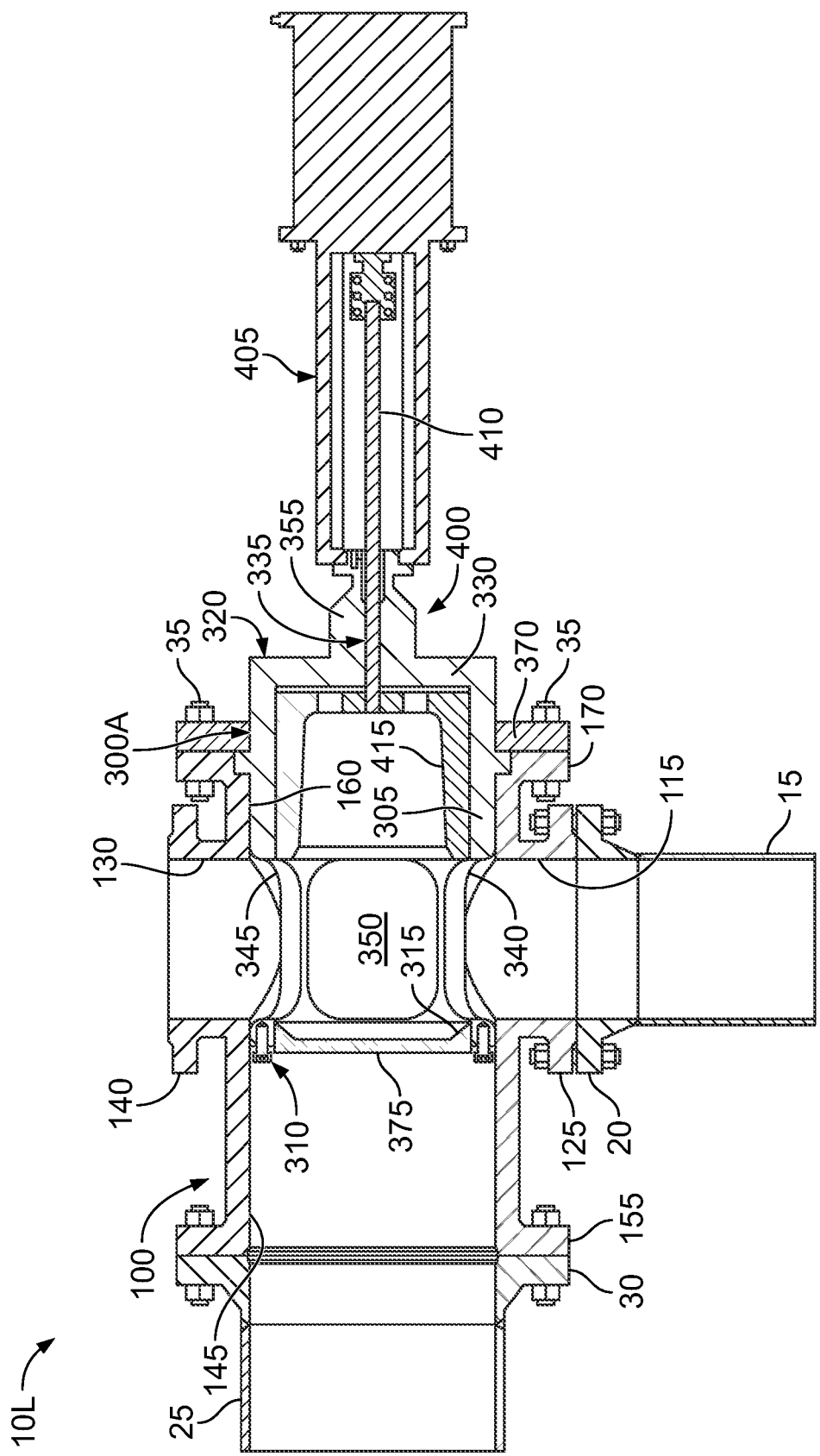
FIG. 17 is a side cross-sectional view of a twelfth example pipe cleaning assembly including the connection fixture of FIG. 1 and the bonnet of FIG. 14.

Referring to FIG. 17, a twelfth example pipe cleaning assembly 10L is shown that uses connection fixture 100 and bonnet assembly 400 and can be used to clean the piping system. In pipe cleaning assembly 10L, bonnet 300A of bonnet assembly 400 is inserted through second auxiliary aperture 160 of connection fixture 100, is positioned within cavity 110 of body 105, and is secured in place by ring plate 370, as described above. Bonnet 300A is positioned in the third position such that first opening 340 is generally aligned with first aperture 115, second opening 345 is generally aligned with first auxiliary aperture 130, third opening 350 is blocked by body 105 so that bonnet 300A directs fluid between first aperture 115 and first auxiliary aperture 130 and prevents fluid flow to second auxiliary aperture 160. Plate 375 is also secured to bonnet 300A at first end 310 to prevent fluid flow through open first end 310 of bonnet 300A and through second aperture 145.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Valve plug 415 is installed within bonnet 300A such that valve plug 415 is movable within bonnet 300A, as described above. Plate 375 is secured to first end 310 of bonnet 300A to prevent fluid flow through open first end 310 of bonnet 300A and second aperture 145. Actuator 405 is mounted to bonnet 300A such that actuator shaft 410 extends through opening 335 in end wall 330 and actuator shaft 410 is secured to valve plug 415 to move valve plug 415 within bonnet 300A. Bonnet 300A is installed through second auxiliary aperture 160 and into cavity 110 of body 105 and is positioned in the third position such that bonnet 300A directs fluid between first aperture 115 and first auxiliary aperture 130 and prevents fluid flow to second auxiliary aperture 160. Ring plate 370 is then connected to fourth connection flange 170 to secure bonnet 300A within connection fixture 100. If already installed, threaded members 35 can be loosened, without removing ring plate 370, bonnet 300 is then rotated within connection fixture 100 to the desired position, without removing bonnet 300 from the connection fixture 100, and threaded members 35 are tightened secure ring plate 370 and position bonnet 300 in the third position. Valve plug 415 is moved to the second (closed) position until a pressure within the piping system reaches a predetermined pressure. Once the predetermined pressure has been reached, valve plug 415 is moved to first (open) position to allow pressurized fluid to flow through the piping system to clean the piping system. Once the cleaning is complete, connection fixture 100 can be removed and the control valve can be installed between first pipe section 15 and second pipe section 25. This process allows the piping system to be cleaned without risking wear or damage to the control valve during the cleaning process.

Figure 18:
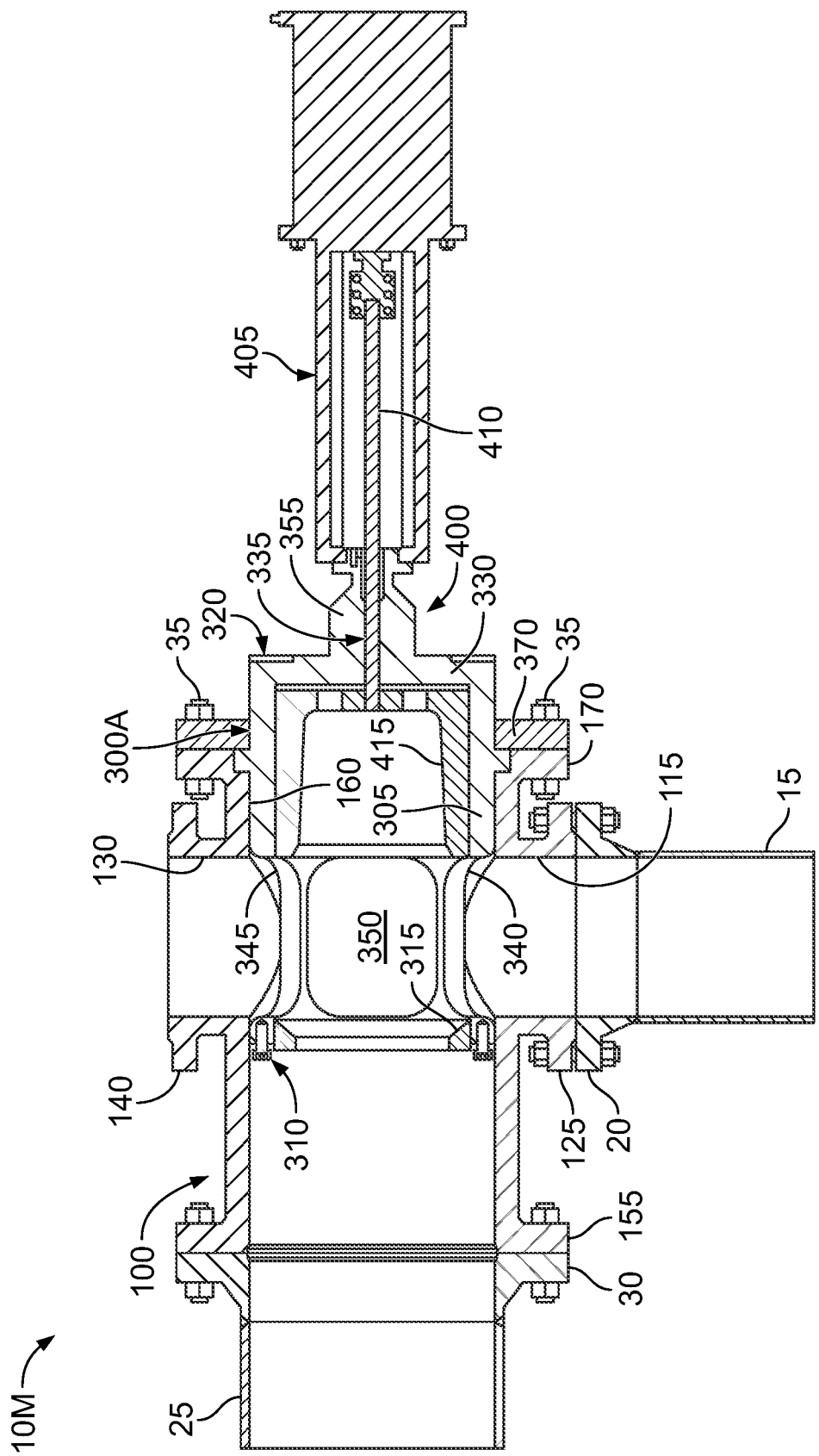
FIG. 18 is a side cross-sectional view of a thirteenth example pipe cleaning assembly including the connection fixture of FIG. 1 and the bonnet of FIG. 14.

Referring to FIG. 18, a thirteenth example pipe cleaning assembly 10M is shown that uses connection fixture 100 and bonnet assembly 400 and can be used to clean the piping system. In pipe cleaning assembly 10M, bonnet 300A of bonnet assembly 400 is inserted through second auxiliary aperture 160 of connection fixture 100, is positioned within cavity 110 of body 105, and is secured in place by ring plate 370, as described above. Bonnet 300A is positioned in the third position such that first opening 340 is generally aligned with first aperture 115, second opening 345 is generally aligned with first auxiliary aperture 130, third opening 350 is blocked by body 105 so that bonnet 300A directs fluid between first aperture 115, second aperture 145, and first auxiliary aperture 130 and prevents fluid flow to second auxiliary aperture 160. This configuration allows fluid flow and debris to be blown out of the piping system through first auxiliary aperture 130 when the piping system is pressurized, which is highly advantageous for closed piping systems that have no existing vent locations. However, this method of cleaning requires a large amount of steady state flow, which is often not available. In these situations, valve plug 415 can be moved to the second (closed) position to block fluid flow through connection fixture 100 and allow the pressure within the piping system to increase. Once a target pressure has been reached, valve plug 415 can be rapidly moved to the first (open) position by actuator 405 to depressurize the piping system and allow fluid flow and debris to be blown out of the piping system at high flow rates. This technique allows the piping system to be pressurized with a relatively small compressor and yet high flow rates can be achieved.

In this configuration, connection fixture 100 can be installed between first pipe section 15 and second pipe section 25 of the piping system in place of a control valve or other sensitive component during construction of the piping assembly or, if the control valve was installed during construction, the control valve can be removed from first pipe section 15 and second pipe section 25 and connection fixture 100 can be installed in place of the control valve between first pipe section 15 and second pipe section 25. Valve plug 415 is installed within bonnet 300A such that valve plug 415 is movable within bonnet 300A, as described above. Actuator 405 is mounted to bonnet 300A such that actuator shaft 410 extends through opening 335 in end wall 330 and actuator shaft 410 is secured to valve plug 415 to move valve plug 415 within bonnet 300A. Bonnet 300A is installed through second auxiliary aperture 160 and into cavity 110 of body 105 and is positioned in the third position such that bonnet 300A directs fluid between first aperture 115, second aperture 145, and first auxiliary aperture 130 and prevents fluid flow to second auxiliary aperture 160. Ring plate 370 is then connected to fourth connection flange 170 to secure bonnet 300A within connection fixture 100. If already installed, threaded members 35 can be loosened, without removing ring plate 370, bonnet 300 is then rotated within connection fixture 100 to the desired position, without removing bonnet 300 from the connection fixture 100, and threaded members 35 are tightened secure ring plate 370 and position bonnet 300 in the third position. Valve plug 415 is moved to the second (closed) position until a pressure within the piping system reaches a predetermined pressure. Once the predetermined pressure has been reached, valve plug 415 is moved to first (open) position to allow pressurized fluid to flow through the piping system to clean the piping system. Once the cleaning is complete, connection fixture 100 can be removed and the control valve can be installed between first pipe section 15 and second pipe section 25. This process allows the piping system to be cleaned without risking wear or damage to the control valve during the cleaning process.

While various embodiments have been described above, this disclosure is not intended to be limited thereto. Variations can be made to the disclosed embodiments that are still within the scope of the appended claims.

What is claimed is:

1. A pipe cleaning assembly, comprising:
   a connection fixture comprising a body defining a cavity, a first aperture in fluid communication with the cavity, a first connection flange extending from and surrounding the first aperture, an opposing first auxiliary aperture in fluid communication with the cavity and coaxially aligned with the first aperture, a third connection flange extending from and surrounding the first auxiliary aperture, a second aperture in fluid communication with the cavity, a second connection flange extending from and surrounding the second aperture, an opposing second auxiliary aperture in fluid communication with the cavity and coaxially aligned with the second aperture, and a fourth connection flange extending from and surrounding the second auxiliary aperture; and
   a diverter trim positioned within the second auxiliary aperture and within the cavity of the body, the diverter trim including a wall that extends across the diverter trim and directs fluid flowing through the connection fixture; and
   wherein the diverter trim further comprises:
   a generally cylindrical wall having an open first end and an open second end, opposite the first end;
   a first opening formed through the generally cylindrical wall;
   a second opening formed through the generally cylindrical wall, the second opening coaxially aligned with the first opening and positioned on an opposite side of the generally cylindrical wall from the first opening; and
   a wall extending entirely across an interior of the generally cylindrical wall and configured to prevent fluid flow between the first opening and the second opening, allow fluid flow between the open first end and the first opening, and allow fluid flow between the open second end and the second opening.

2. The pipe cleaning assembly of claim 1, wherein the diverter trim directs fluid between the first aperture and the second aperture and prevents fluid flow to the first auxiliary aperture and the second auxiliary aperture.

3. The pipe cleaning assembly of claim 2, comprising a filter positioned between the diverter trim and the second aperture.

4. The pipe cleaning assembly of claim 1, wherein the diverter trim directs fluid between the first aperture and the second auxiliary aperture and between the second aperture and the first auxiliary aperture.

5. The pipe cleaning assembly of claim 4, comprising a first valve connected to the third connection flange of the connection fixture and/or a second valve connected to the fourth connection flange of the connection fixture to control fluid flow through the first auxiliary aperture and/or the second auxiliary aperture.

6. The pipe cleaning assembly of claim 1, wherein the diverter trim further comprises:
   a first diverter pipe connected to the fourth connection flange of the connection fixture and in fluid communication with the second auxiliary aperture;
   a second diverter pipe connected to the third connection flange of the connection fixture and in fluid communication with the first auxiliary aperture; and
   a valve positioned between the first diverter pipe and the second diverter pipe; wherein
   the diverter trim redirects fluid from the first aperture to the second auxiliary aperture and from the first auxiliary aperture to the second aperture.

7. The pipe cleaning assembly of claim 6, comprising a filter positioned between the diverter trim and the second aperture.

8. The pipe cleaning assembly of claim 1, and further comprising:
   a first valve connected to the third connection flange of the connection fixture to control fluid flow through the first auxiliary aperture; and
   a plate positioned over the second auxiliary aperture and secured to the body to prevent fluid flow through the second auxiliary aperture.

9. The pipe cleaning assembly of claim 8, wherein an axis of the first aperture is perpendicular to an axis of the second aperture.

10. The pipe cleaning of claim 1, comprising a second valve connected to the fourth connection flange of the connection fixture to control fluid flow through the second auxiliary aperture.

* * * * *

UNITED STATES PATENT AND TRADEMARK OFFICE
CERTIFICATE OF CORRECTION

PATENT NO. : 11,945,011 B2
APPLICATION NO. : 17/111060
DATED : April 2, 2024
INVENTOR(S) : Michel K. Lovell It is certified that error appears in the above-identified patent and that said Letters Patent is hereby corrected as shown below:

In the Specification

Column 2, Line 19, "valve" should be -- valve is --.

Column 4, Line 49, "is perspective" should be -- is a perspective --.

Column 6, Line 55, "it" should be -- in --.

Column 7, Line 3, "(Cu)" should be -- ($C_v$) --.

Column 8, Line 41, "depressurized" should be -- depressurize --.

Column 9, Line 26, "100," should be -- 10C, --.

Column 10, Line 8, "that" should be -- than --.

Column 20, Line 45, "depressurized" should be -- depressurize --.

In the Claims

Column 22, Line 51, Claim 10 "pipe cleaning of claim" should be -- pipe cleaning assembly of claim --.

Signed and Sealed this
Twenty-ninth Day of April, 2025

Coke Morgan Stewart
*Acting Director of the United States Patent and Trademark Office*